(12) United States Patent  (10) Patent No.: US 8,099,332 B2
Lemay et al.  (45) Date of Patent: Jan. 17, 2012

(54) USER INTERFACE FOR APPLICATION MANAGEMENT FOR A MOBILE DEVICE

(75) Inventors: Steve Lemay, San Francisco, CA (US);
Sean Kelly, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 134 days.

(21) Appl. No.: 12/354,616

(22) Filed: Jan. 15, 2009

(65) Prior Publication Data

US 2009/0307105 A1  Dec. 10, 2009

Related U.S. Application Data

(60) Provisional application No. 61/059,730, filed on Jun. 6, 2008.

(51) Int. Cl.
*G06Q 30/00* (2006.01)
*G06F 3/048* (2006.01)

(52) U.S. Cl. .................. 705/26.1; 715/810; 715/863

(58) Field of Classification Search .................. None
See application file for complete search history.

(56) References Cited

U.S. PATENT DOCUMENTS

| 5,406,307 | A | * | 4/1995 | Hirayama et al. | 715/800 |
|---|---|---|---|---|---|
| 5,634,128 | A | * | 5/1997 | Messina | 719/316 |
| 2003/0236867 | A1 | | 12/2003 | Natsuno et al. | |
| 2004/0109013 | A1 | | 6/2004 | Goertz | |
| 2004/0192440 | A1 | * | 9/2004 | Evans et al. | 463/30 |
| 2005/0154798 | A1 | | 7/2005 | Nurmi | |

FOREIGN PATENT DOCUMENTS

EP    1 462 999 A2    9/2004

OTHER PUBLICATIONS

International Search Report and Written Opinion mailed Aug. 12, 2009 from corresponding International Application No. PCT/US2009/043840, 15 pages.

* cited by examiner

*Primary Examiner* — Faris Almatrahi
(74) *Attorney, Agent, or Firm* — Fish & Richardson P.C.

(57) ABSTRACT

This specification describes technologies relating to user interfaces for mobile devices. In general, one aspect of the subject matter described in this specification can be embodied in methods that include the actions of receiving a touch input to access an application management interface on a mobile device; presenting an application management interface; receiving one or more inputs within the application management interface including an input to install a particular application; installing the selected application; and presenting the installed application.

25 Claims, 22 Drawing Sheets

USER INTERFACE FOR APPLICATION MANAGEMENT FOR A MOBILE DEVICE

CROSS-REFERENCE TO RELATED APPLICATIONS

This application claims the benefit under 35 U.S.C. §119 (e) of U.S. Provisional Application Ser. No. 61/059,730, filed on Jun. 6, 2008.

BACKGROUND

The present disclosure relates to user interfaces for mobile devices.

Conventional mobile devices are often dedicated to performing specific functions. For example, a mobile phone provides telephony services, a personal digital assistant (PDA) provides a way to organize addresses, contacts and notes, a media player plays content, email devices provide email communication, a browser to surf the Internet, etc. Modern mobile devices can include two or more of these functions.

In particular, a mobile device can include a number of different applications, which a user can access independent of other applications. For example, the mobile device can include one or more games, web applications, or productivity applications.

SUMMARY

This specification describes technologies relating to user interfaces for mobile devices. In general, one aspect of the subject matter described in this specification can be embodied in methods that include the actions of receiving a touch input to access an application management interface on a mobile device; presenting an application management interface; receiving one or more inputs within the application management interface including an input to install a particular application; installing the selected application; and presenting the installed application. Other embodiments of this aspect include corresponding systems, apparatus, and computer program products.

These and other embodiments can optionally include one or more of the following features. Presenting the application management interface further includes presenting a menu portion and a display portion. The display portion includes one or more application objects corresponding to respective applications, each application object presenting information about the respective application. The menu portion includes multiple tabs, each tab providing access to particular features of the application management interface. Receiving one or more user inputs includes receiving a selection of a particular application object. The method further includes, in response to the selection, transitioning the display portion to present additional information about the selected application. Presenting additional information includes presenting one or more reviews of the selected application. The selected application object is an application update object associated with an update to an application previously installed on the mobile device. Installing the selected application includes presenting a placeholder object on a display of the mobile device, the placeholder object including an indicator of installation progress. The method further includes receiving payment information from a user to purchase the particular application. The mobile device includes a multi-touch-sensitive display.

In general, one aspect of the subject matter described in this specification can be embodied in systems that include a processor and a user interface for providing interaction with a user, the user interface including a display portion including one or more application objects corresponding to respective applications, each application object presenting information about the respective application, and a menu portion including multiple tabs, each tab providing access to particular features of the application management interface. Other embodiments of this aspect include corresponding methods, apparatus, and computer program products.

Particular embodiments of the invention can be implemented to realize one or more of the following advantages. A user can easily navigate an application store to identify and download applications for a mobile device. Users can be notified of updates to previously downloaded applications without navigating to an update interface. Users can quickly provide feedback on applications including rating the applications and reporting identified problems. Additionally, users can quickly and easily share information on particular applications of interest with other users. Once an application is selected, the user can access other features and applications of the mobile device while waiting for the application to download.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
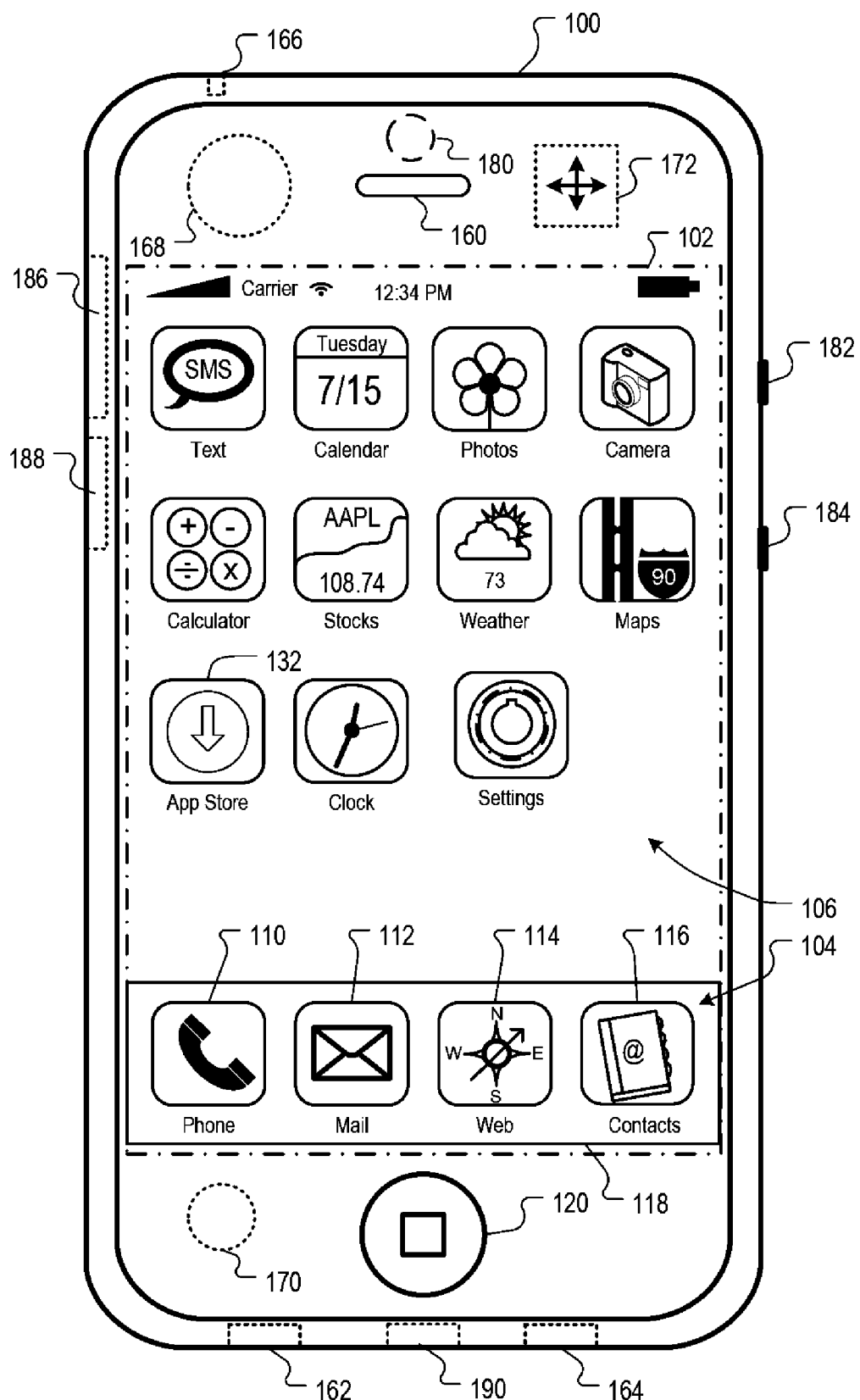
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Exemplary Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object, a calendar object, a photos object, a camera object, a calculator object, a stocks object, a weather object, a maps object, a notes object, a clock object, an address book object, a settings object, and an app store object 132. Touching the SMS display object can, for example, invoke an SMS messaging environment and supporting functionality; likewise, each selection of a display object can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrows. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, the port device 190, e.g., a Universal Serial Bus (USB) port, or a docking port, or some other wired port connection, is included. The port device 190 can, for example, be utilized to establish a wired connection to other computing devices, such as other communication devices 100, network access devices, a personal computer, a printer, or other processing devices capable of receiving and/ or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol," which is incorporated by reference here in its entirety.

Figure 2:
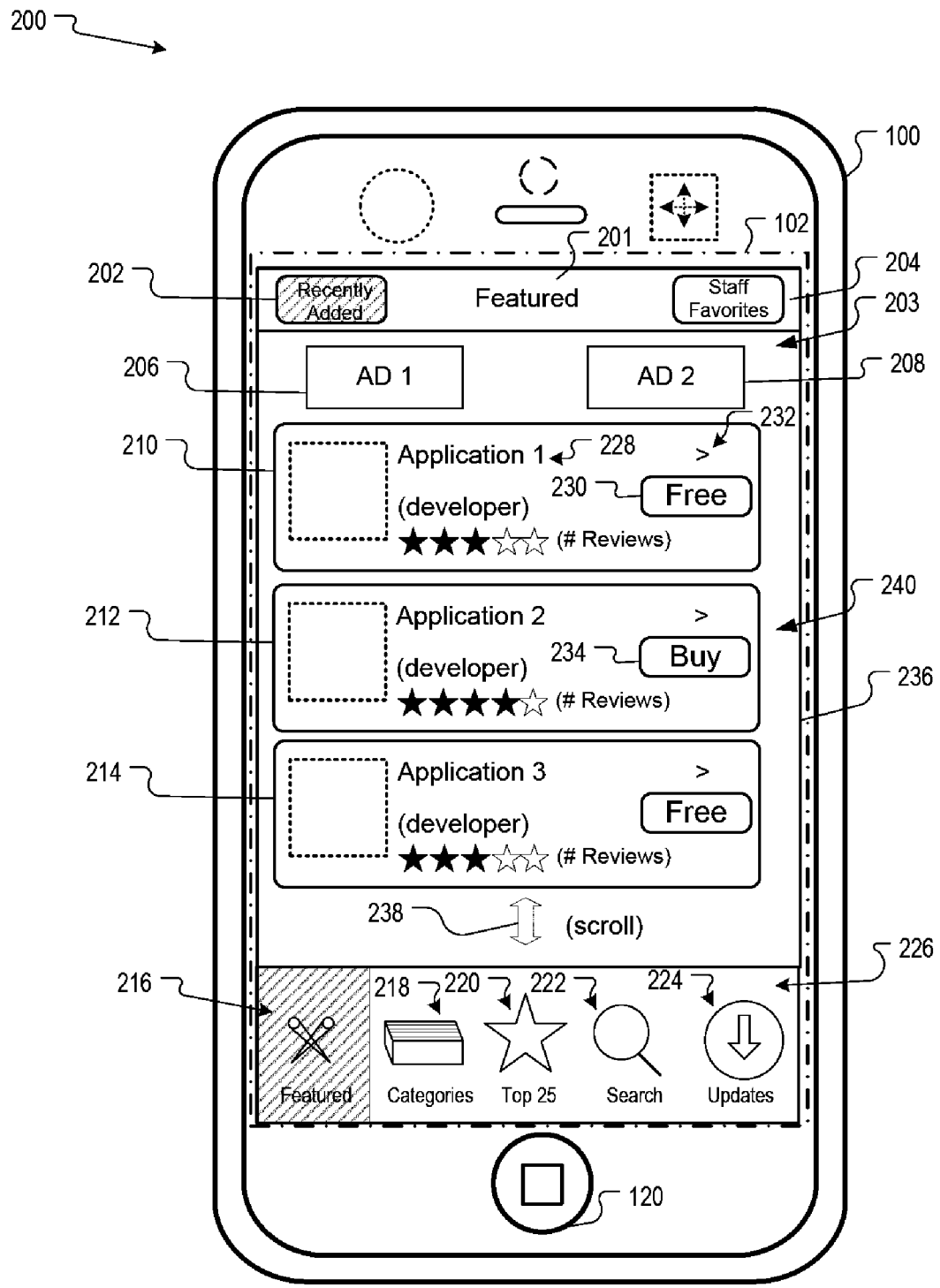
FIG. 2 is a block diagram of an example user interface of the mobile device after invoking an application store display object.

FIG. 2 is a block diagram 200 of an example user interface of the mobile device 100 after invoking an application store display object (e.g., app store display object 132 of FIG. 1). For example, the user can access the app store display object 132 using the touch-sensitive display 102 (e.g., by pressing the app store display object 132), resulting in a transition to an application store interface. In some implementations, touching the app store display object 132 in FIG. 1 causes an animated transition to the application store interface.

The user interface for the application store includes a display portion 236 and a menu portion 240. The menu portion 226 can include several tabs. In particular, the menu portion 226 includes a featured tab 216, a categories tab 218, a top 25 tab 220, a search tab 222, and an updates tab 224. Each of the tabs in the menu portion 226 can be used to access different features of the application store, each of which will be described in greater detail below. In some implementations, other tabs can be provided and/or the tab order can vary, for example, as determined by the application store, the mobile device, or based on input received from another remote location.

The display portion 236 displays a featured interface 203 associated with the featured tab 216, which is shown as highlighted in the display portion 236. The featured interface 203 includes a title bar 201. The title bar 201 includes a recently added button 202 and a staff favorites button 204. The recently added button 202 and staff favorites button 204 are shown as separate buttons. However, the buttons can take other forms including, for example, a single toggle button that can be switched from one to the other by touching the button more than once.

The featured interface 203 also includes one or more application objects 240. The recently added button 202 is shown as currently selected (e.g., based on a user input to the touch-sensitive display 102). When the recently added button 202 is selected, the application objects 240 displayed correspond to applications that have been recently added to the application store.

In some implementations, the recently added applications are specified by a time period from inclusion of the particular application to the application store. For example, the recently added applications can include applications made available in the application store within the past thirty days. In some other implementations, however, the recently added applications can be a specified number (e.g., 25) of most recently added applications to the application store regardless of the actual elapsed time.

The application objects 240 can be ordered within the display portion 236 according to one or more criteria. For example, the application objects can be ordered by date added to the application store, alphabetically, or according to user ratings.

In particular, the application objects 240 shown in the display portion 236 include application objects 210, 212, and 214. Additionally, when the display portion 236 cannot display all of the application objects 240 at one time, the user can scroll 238 up or down to view additional application objects 240. While a scroll 238 is represented by a dotted arrow at particular portion of the display portion 236, the user can scroll 238 from other points. In particular, the user can scroll by gesturing in a particular direction (e.g., up or down) across the touch-sensitive display 102.

Each application object 240 includes information associated with the particular application. For example, application object 210 includes application information 228. The application information 228 can include an image representing the application, the application name (e.g., "Application 1" for application object 210), a developer's name, and rating information. In some implementations, the rating information is represented by a specified number of stars. Stars are filled to indicate the average rating (e.g., three out of five5) for the application. In some implementations, stars are partially filled to represent a finer degree of granularity of the average rating.

In some other implementation, different symbols are used to represent the rating information. For example, in some implementations, the small dots are used to represent unselected stars, which are replaced by stars up to the rating level, such that there are only stars equal to the average rating. In some implementations, the rating information also includes a number of reviews used (e.g., from individual users) to determine the average rating.

The application objects 240 also include a purchasing information 230. The purchasing information indicates whether the application is free or must be purchased (e.g., identified by "free" or "buy" labels). In some implementations, the purchasing information indicates the cost of the application (e.g., $5.00). In some other implementations, the application object 240 can indicate whether or not the user has already installed the particular application. For example, if the user has already installed the application identified by application object 210, the purchase information 230 can read "installed" instead of "free". Alternatively, the purchase information 230 can read "uninstall" indicating that the user can uninstall the already installed application.

The application objects 240 can also include an ">" indicator (e.g., indicator 232 of application object 210). The indicator 232 indicates that selecting a particular application object (e.g., by touching application object 210) will transition the user interface to provide additional information about the selected application. The transition can be animated.

The display portion 236 can also include one or more advertisements. In the display portion 236, a first advertisement 206 and a second advertisement 208 are shown near the title bar 201. In other implementations, only a single advertisement is presented. Alternatively, additional advertisements can be presented. Additionally, while the advertisements are shown near the title bar 201, one or more advertisements can be presented at different locations on the display portion 236.

Figure 3:
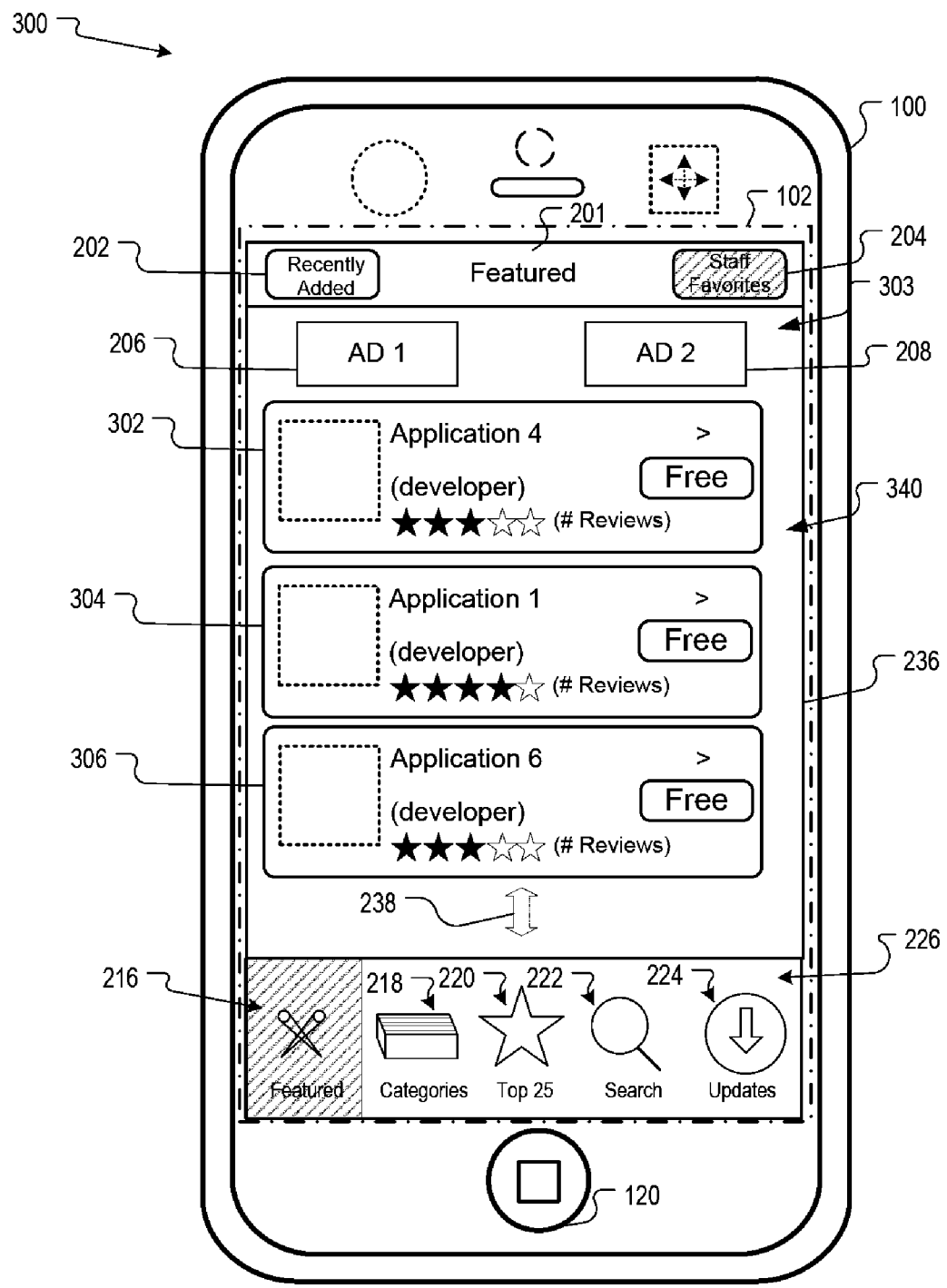
FIG. 3 is a block diagram of an example user interface of the mobile device after selecting a staff favorites button.

FIG. 3 is a block diagram 300 of an example user interface of the mobile device 100 after selecting a staff favorites button (e.g., staff favorites button 204 in FIG. 2). As shown in FIG. 2, the title bar 201 including both the recently added button 202 and the staff favorites button 204. When the staff favorites button 204 is selected, the display portion 236 presents application objects 340 as part of the featured interface 303. The application objects 340 can include one or more of the recently added application objects 240 or can be distinct from the application objects 240.

In some implementations, the application objects 340 represent application objects selected by one or more individuals associated with the application store. For example, the staff favorites can be selected by a group of individuals within a specified time period. Thus, the staff favorites can change regularly, e.g., every 30 days. In some other implementations, the staff favorites are identified according to the applications receiving a highest ratings from a specified group of individuals. In some implementations, the number of application objects 340 identified as staff favorites is limited to a specified number (e.g., top 25 applications).

The application objects 340 can be ordered within the featured interface 303 according to one or more criteria. For example, the application objects can be ordered by date added to the application store, alphabetically, or by staff rating.

In particular, the application objects 340 shown in the display portion 236 include application objects 302, 304, and 306. Additionally, when the display portion 236 cannot display all of the application objects 340 at one time, the user can scroll 238 up or down to view additional application objects 340 as described above with respect to FIG. 2.

Each application object 340 includes information associated with the respective application. Similar to the application information 228 described above with respect to FIG. 2, the application information can include an image representing the application, the application name (e.g., "Application 4" for application object 302), a developer's name, and rating information. In some implementations, the rating information is represented by a specified number of stars identifying an average rating for the corresponding application.

The application objects 340 also include purchasing information. The purchasing information indicates whether the "staff favorite" applications are free or must be purchased. In some implementations, the purchasing information indicates the cost of the particular application (e.g., $5.00). In some other implementations, the application object 340 indicates whether or not the user has already installed the particular application. For example, if the user has already installed the application identified by application object 302, the purchase information can read "installed" instead of "free". Alternatively, the purchase information can read "uninstall" indicating that the user can uninstall the already installed application.

The application objects 340 can also include an ">" indicator (e.g., indicator 232 of FIG. 2). The indicator indicates that selecting a particular application object (e.g., by touching application object 302) will transition the user interface to provide additional information about the selected application. The transition can be animated.

The featured interface 303 can also include one or more advertisements. In particular, the display portion 236, presents a first advertisement 206 and a second advertisement 208 near the title bar 201. In other implementations, only a single advertisement is presented. Alternatively, additional advertisements can be presented. Additionally, while the advertisements are shown near the title bar 201, one or more advertisements can be presented at different locations on the display portion 236.

In either FIG. 2 or FIG. 3, a user selection of an application object (e.g., one of application objects 240 or 340, respectively), the user interface can transition to provide additional information regarding the application associated with the selected application object.

Figure 4:
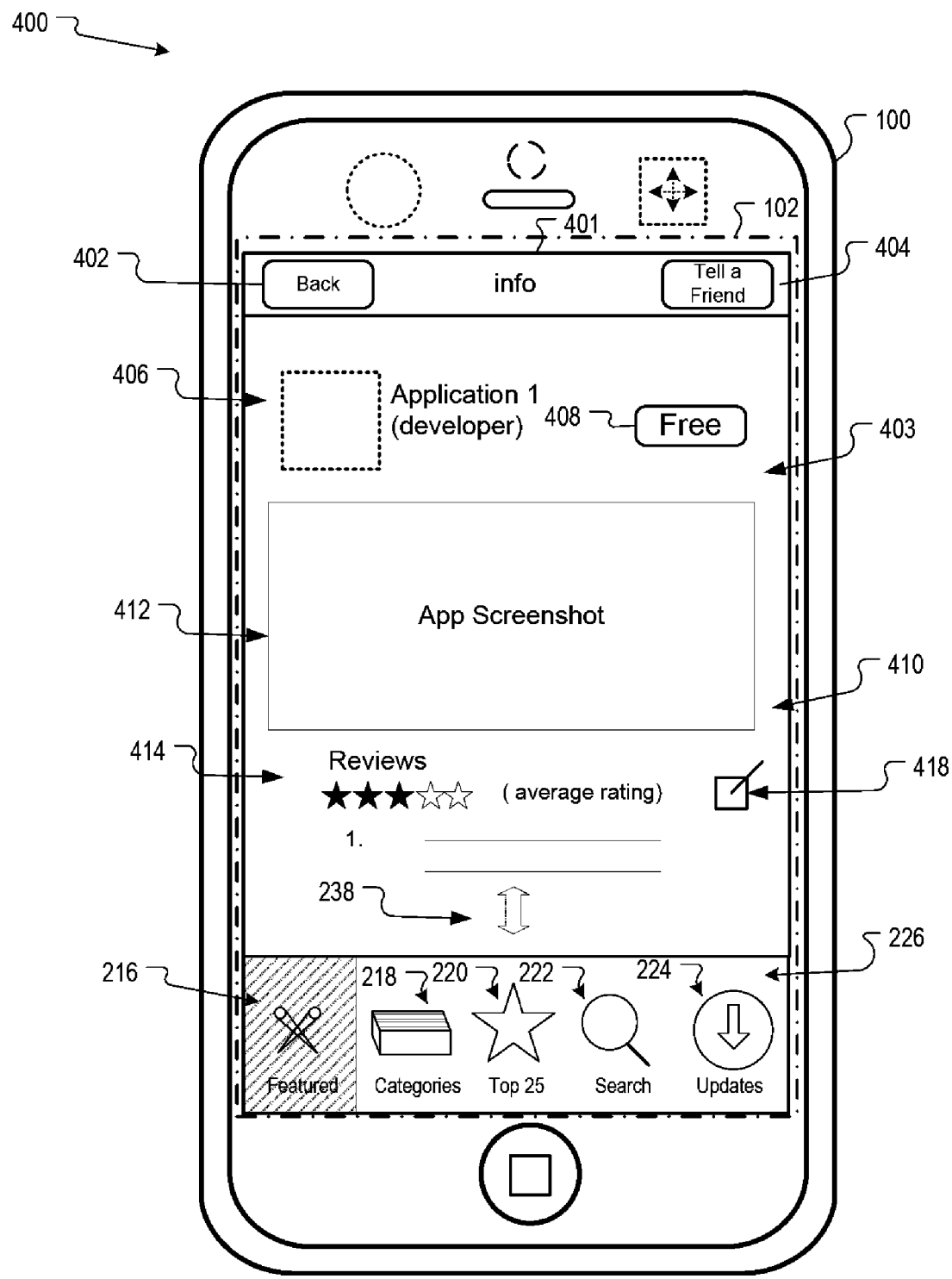
FIG. 4 is a block diagram of an example user interface of the mobile device for providing information associated with a particular application.

FIG. 4 is a block diagram 400 of an example user interface of the mobile device 100 for providing information associated with a particular application. In particular, an application information interface 403 corresponds to the user selection of application object 210 of FIG. 2.

The application information interface 403 includes an information display portion 410 and the menu portion 226. The menu portion 226 includes the featured tab 216, the categories tab 218, the top 25 tab 220, the search tab 222, and the updates tab 224. In some implementations, the menu portion 226 is hidden when the application information interface 403 is presented.

The display portion 410 includes a title bar 401. The title bar 401 identifies the user interface as an application information interface. Additionally, the title bar 401 can include a back button 402 and a "tell a friend" button 404. The back button 402 allows the user to, for example, cancel the application information interface 403 and return to the previous user interface (e.g., the user interface for the app store shown in FIG. 2 or 3). The "tell a friend" button 404 allows the user to send information about the selected application. In particular, touching the "tell a friend" button 404 causes the user interface to transition into an interface for notifying another person about the particular application. The interface for notifying another person about the selected application is described in greater detail below with respect to FIG. 5.

The display portion 410 also includes application information 406, purchase information 408, an application screenshot 412, and reviews 414. The application information 406 includes, for example, the application name and the developer. The application information 406 can also include an image representing the particular application as well as other information, for example, the date the application was added to the application store. The application information 406 can also include a brief description of the application.

The purchase information 408 identifies whether the selected application is free or available for purchase. Alternatively, the purchase information 408 can indicate the price of the application (e.g., $5.00). In some implementations, the user can redeem credit to purchase the application. For example, the user can have a gift card, a coupon, or other credit that can be used toward purchasing applications on the application store. In some implementations, the user is presented with a "redeem" button in the application information interface. Touching the redeem button generates an interface where the user can input account information corresponding to the credit to be applied.

Additionally, in some implementations, touching the purchase information 408 initiates a process for downloading the application. For example, if the application is free, the download process can begin without further user input. Alternatively, if purchase is required, a user account can be accessed to purchase the application. In some implementations, the user can redeem a coupon or similar credit to purchase the application. In some other implementations, the user is required to provide account or other authentication information before purchasing the application.

In some alternative implementations, the purchase information 408 indicates whether the user has already installed the application (e.g., by including text "installed" or "uninstall" in the purchase information 408).

The screenshot 412 can provide a screen capture image of the application interface. In some implementations, a more detailed description of the application is provided in place of, or in addition to, the screenshot 412. For example, the detailed description can include features of the application and other information. In some implementations, more than one screenshot 412 is provided. Alternatively, in some other implementations, additional screenshots can be provided as thumbnails that can be displayed when selected by the user.

The reviews 414 includes rating information as well as individual reviews of the application. The rating information can include a graphic illustration of an average rating (e.g., using a star rating). Additionally, the number of individual reviews used to determine the average rating can also be provided. The average rating can be followed by one or more individual reviews of the application. In some implementation all reviews are listed. In some other implementations, only a specified number of reviews are listed. In some implementations, the user can scroll 238 to view additional reviews that are not presented within the visible portion of the application information interface 403.

The reviews 414 portion of the application information interface 403 can also include a review button 418 that allows a user to provide a review or other report associated with the application. Providing a review of the application is described below with respect to FIGS. 6-8

Figure 5:
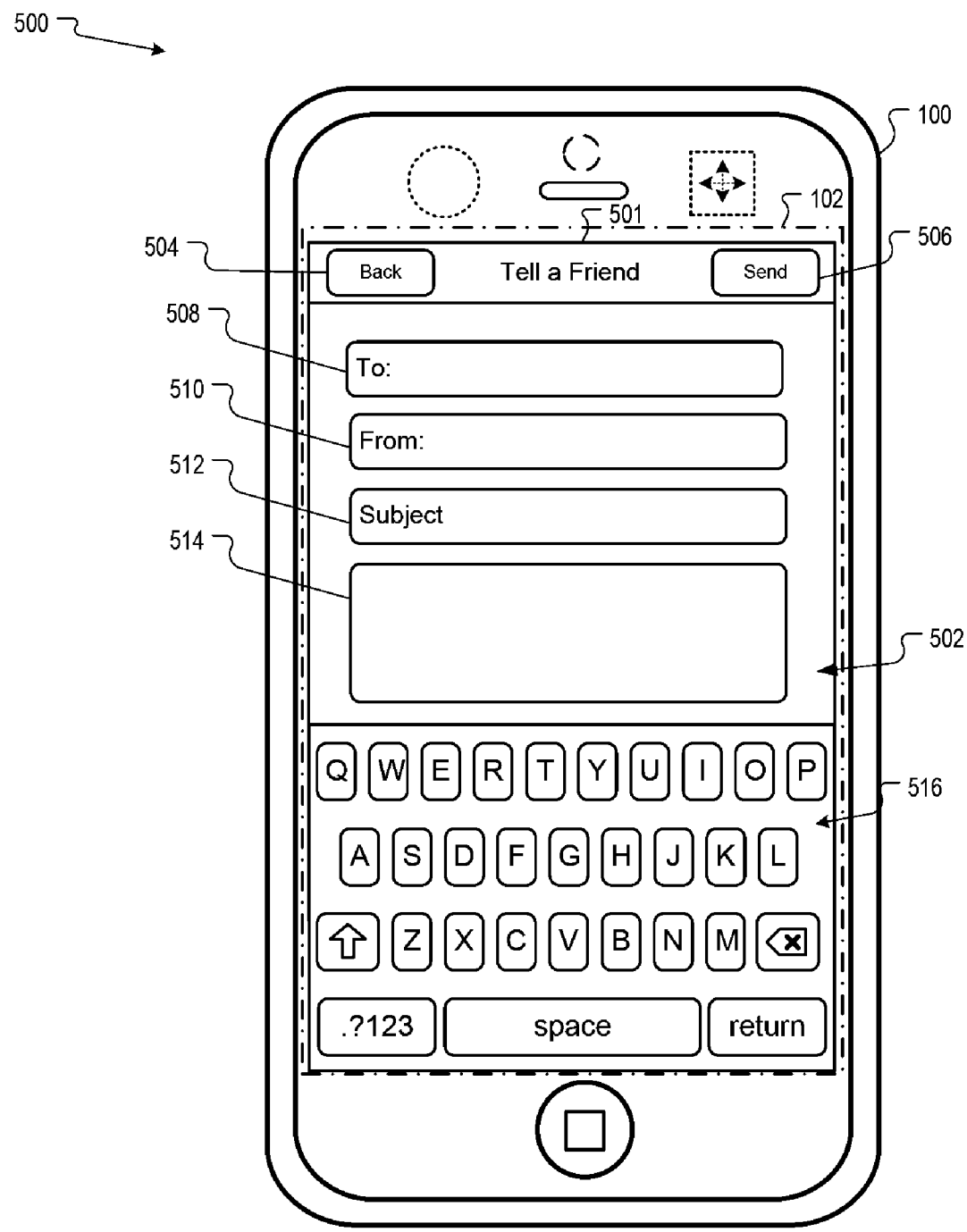
FIG. 5 is a block diagram of an example user interface of the mobile device for notifying another user of an application.

FIG. 5 is a block diagram 500 of an example user interface of the mobile device 100 for notifying another user of an application. In particular, FIG. 5 includes a notification interface 502. The notification interface 502 can be presented in response to the user selecting the "tell a friend" button 404 in FIG. 4.

The notification interface 502 includes a title bar 501. The title bar 501 identifies the notification interface 502 (e.g., as "tell a friend"). Additionally, the title bar 501 includes a back button 504 and a send button 506. The back button 504 can cancel the notification interface 502 and allow the user to return to a preceding user interface (e.g., the application information interface 403). The send button 506 allows the user to send application information to another person.

The notification interface 502 can provide a pre-configured e-mail message that includes a link to the application information in the application store. The notification interface 502 includes a "to" field 508, a "from" field 510, a subject field 512, and a text box 514. The "to" field 508 allows the user to identify the recipient of the notification. The user can input, for example, an e-mail address or a name corresponding to a contact or address book entry. The "from" field 510 allows the user to identify for the recipient the sender of the notification. In some implementations, the "from" field 510 is automatically populated based on user profile or account information. In some other implementations, the "from" field 510 is not presented to the user, but instead is automatically added to the notification. The "subject" field 512 allow the user to specify a subject for the recipient, for example, "check out this application". In some implementations, the subject field 512 is automatically populated by the application store, for example, with the name of the application or other text.

The text box 514 provides additional space for the user to provide additional text to the user (e.g., a message body). In some implementations, the text box 514 has a maximum number of allowed characters for user input.

Input to each field and the text box 514 can be provided using keyboard 516. The keyboard 516 provides a full QWERTY layout of keys for typing. The user inputs text with the touch-sensitive display 102 by touching individual keys according to the desired text. After inputting information into one or more fields, the user can send the notification by touching the send button 506 as described above. In some implementations, sending the notification causes the user interface to transition to the previous user interface (e.g., application information interface 403).

Figure 6:
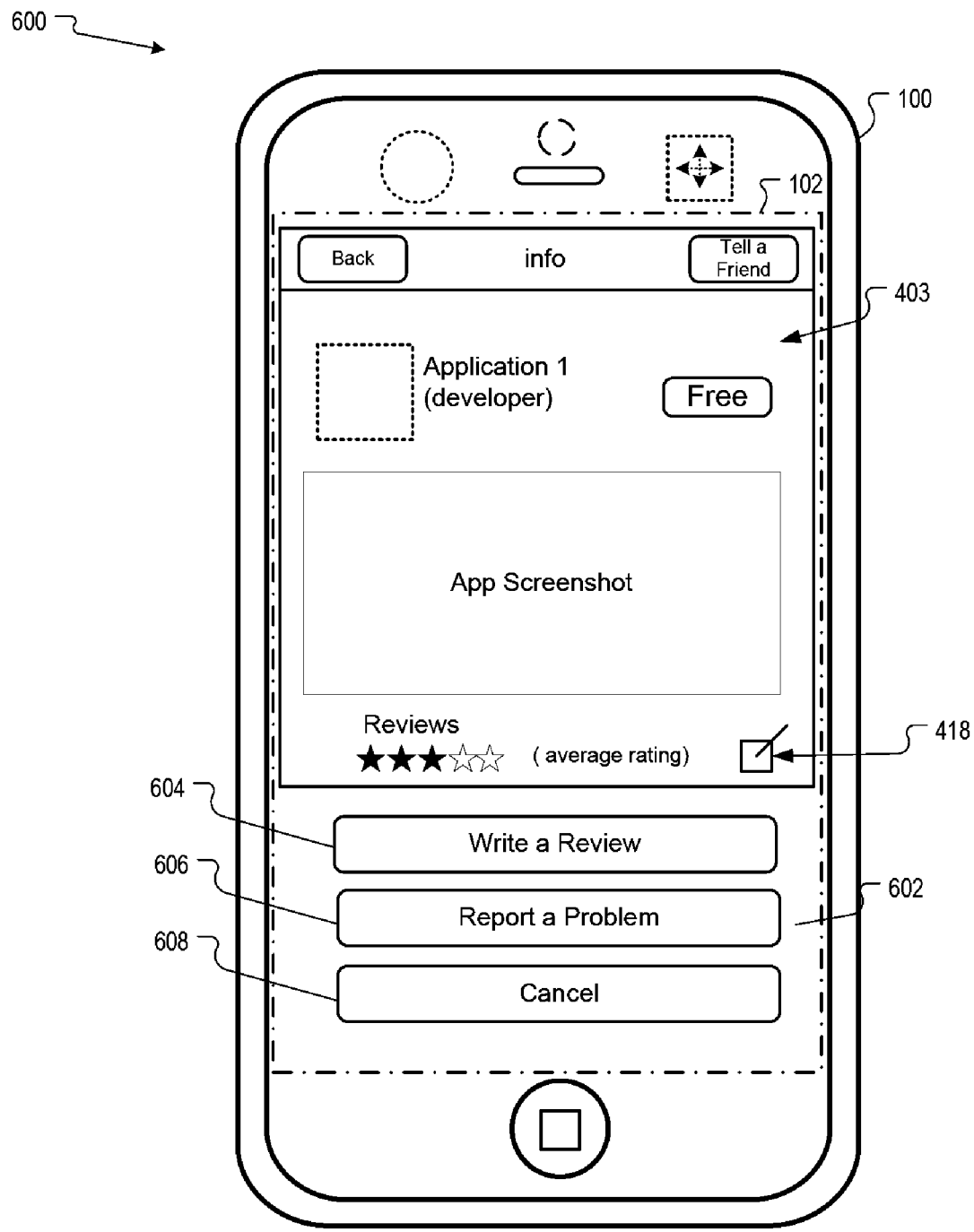
FIG. 6 is a block diagram of an example user interface of the mobile device including a menu for providing information associated with a selected application.

FIG. 6 is a block diagram 600 of an example user interface of the mobile device 100 including a menu 602 for providing information associated with a selected application. In particular, a portion of the application information interface 403 can be overlaid with the menu 602. The menu 602 can be partially transparent such that the overlaid portion of the application information interface 403 is partially visible. In some implementations, the menu 602 is presented in response to the user selecting the review button 418 in the application information interface 403. In some alternative implementations, the menu 602 replaces the application information 403 entirely instead of being provided as a partial overlay.

The menu 602 includes a write a review button 604, a report a problem button 606, and a cancel button 608. The write a review button 604 allows the user to write a review for the application of the application information interface 403. In particular, when the user touches the write a review button 604, the user interface transitions into a review interface (e.g., using an animated transition). The review interface is described in greater detail below with respect to FIG. 7.

The report a problem button 606 allows the user to report a problem with the application identified in the application information interface 403. In particular, when the user touches the report a problem button 604, the user interface transitions into a report interface (e.g., using an animated transition). The report interface is described in greater detail below with respect to FIG. 8.

The cancel button 608 allows the user to cancel the menu 602 and return to the application information interface 403 of FIG. 4.

Figure 7:
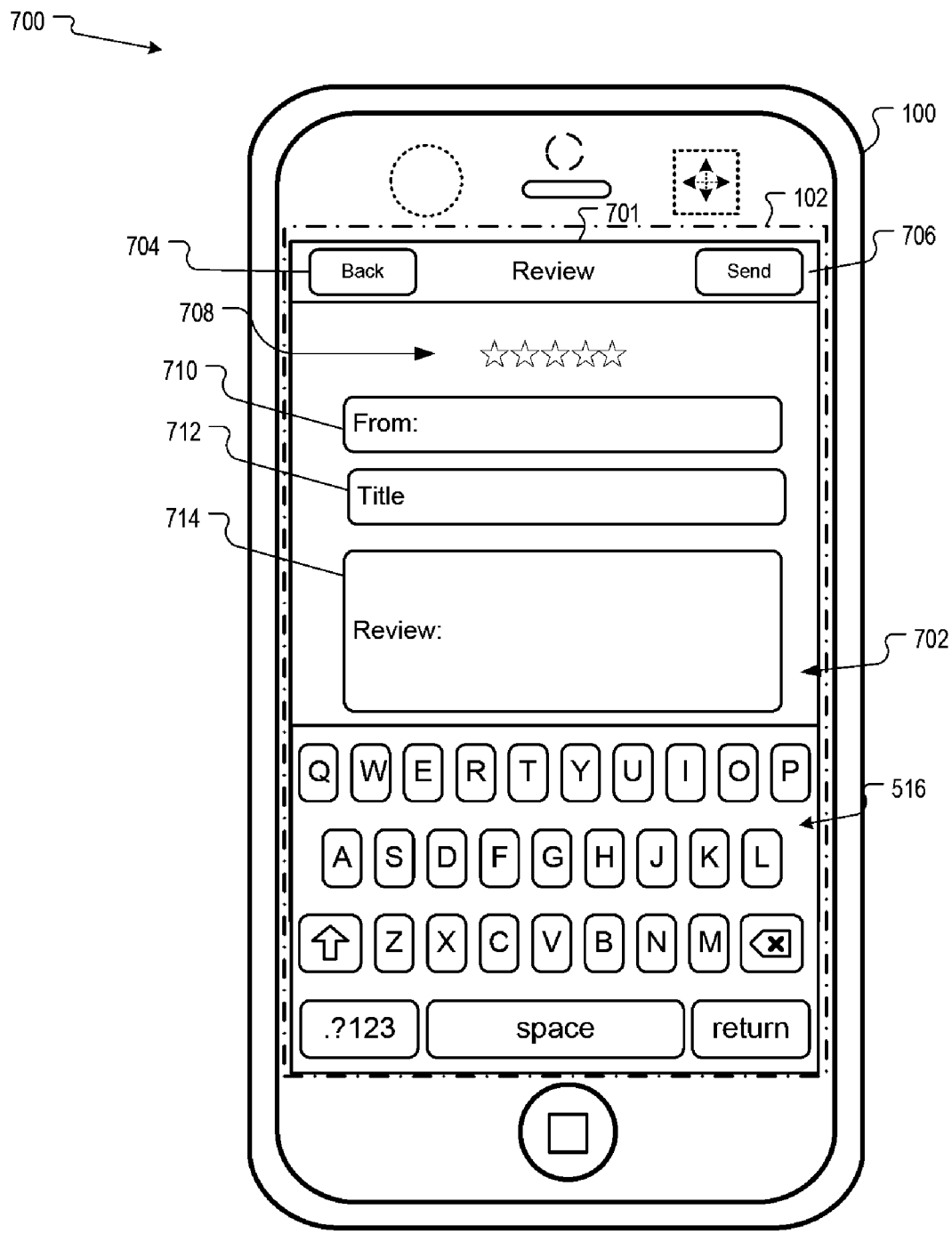
FIG. 7 is a block diagram of an example user interface of the mobile device for reviewing a selected application.

FIG. 7 is a block diagram 700 of an example user interface of the mobile device 100 for reviewing a selected application. In particular, FIG. 7 shows a review interface 702 presented, for example, in response to the user selecting the write a review button 604 (FIG. 6).

The review interface 702 includes a title bar 701 identifying the interface as a review interface. The title bar 701 further includes a back button 704 and a send button 706. The back button 702 can cancel the review interface 702 and allow the user to return to a preceding user interface (e.g., the application information interface 403). The send button 706 allows the user to submit the review.

The review interface 702 includes a rating 708. The rating 708 allows the user to assign a rating value to the application. For example, the user can assign a specified number of stars to the application out of a maximum possible (e.g., from zero to five stars). In particular, the user can assign stars using a gesture motion on the touch-sensitive interface 102. For example, the user can slide a finger in a first direction to incrementally increase the number of stars (to a maximum number, e.g., 5) or in a second direction to incrementally reduce the number of stars (to a minimum number, e.g., zero).

The review interface 702 also includes a "from" field 710, a "title" field 712, and a review text box 714. The "from" field 710 allows the user to identify who is providing the review. In some implementations, the "from" field 710 is automatically populated based on user profile or account information. In some other implementations, the "from" field 710 is not presented to the user, but instead is automatically added to the review. The "title" field 712 allows the user to identify an occupation or capacity in which they are providing the review. In some implementations, the "title" field 712 is not provided.

The text box 714 provides additional space for the user to provide review text beyond the rating value. In some implementations, the text box 714 has a maximum number of allowed characters for user input.

Input to each field and the text box 714 can be provided using keyboard 516. The keyboard 516 provides a full QWERTY layout of keys for typing. The user inputs text with the touch-sensitive display 102 by touching individual keys according to the desired text. After inputting information into one or more fields, the user can submit the review by touching the send button 706 as described above. In some implementations, submitting the review causes the user interface to transition to a previous user interface (e.g., application information interface 403).

Figure 8:
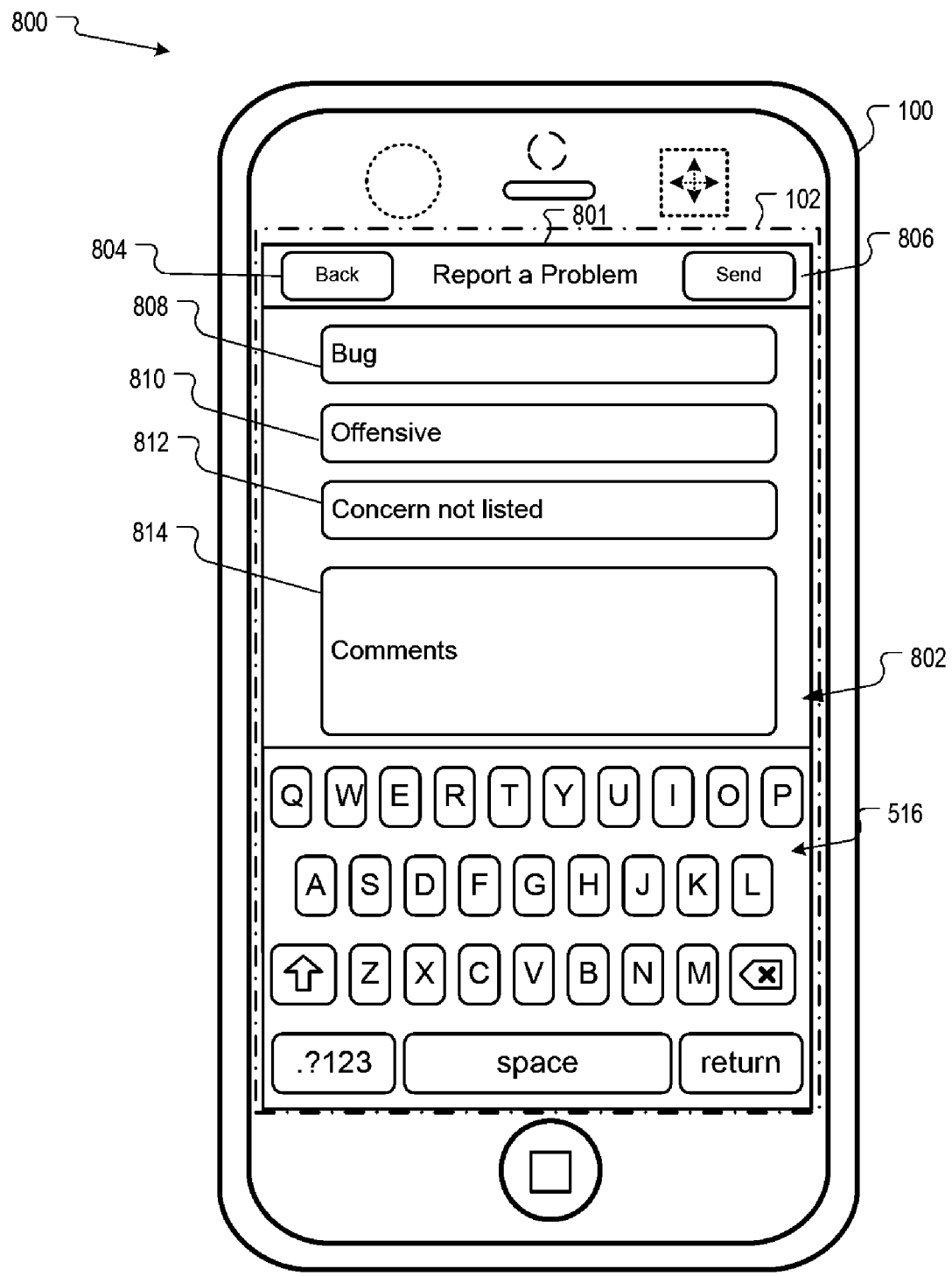
FIG. 8 is a block diagram of an example user interface of the mobile device for reporting on a selected application.

FIG. 8 is a block diagram 800 of an example user interface of the mobile device 100 for reporting on a selected application. In particular, FIG. 8 shows a reporting interface 802 presented, for example, in response to the user selecting the report a problem button 606 (FIG. 6).

The reporting interface 802 includes a title bar 801 identifying the interface as a reporting interface. The title bar 801 further includes a back button 804 and a send button 806. The back button 802, for example, can cancel the reporting interface 802 and allow the user to return to a preceding user interface (e.g., the application information interface 403). The send button 806 allows the user to submit the report.

The review interface 802 includes menu buttons with suggested problems to report. In particular, the review interface 802 includes a report a bug button 808, a report as offensive button 810, and a concern not listed button 812. The user can select one of the menu buttons by touching a particular menu button in the review interface 802. In some implantations, when a user selects a particular menu button, the selected menu button is highlighted. In some other implementations, when the user selects a menu button an icon is displayed to indicate selection, for example, a checkmark.

Additionally, a text box 814 is presented. The text box 814 allows the user to optionally describe the reported problem. In some implementations, the text box 814 has a maximum number of allowed characters for user input.

Input to the text box 814 can be provided using keyboard 516. The keyboard 516 provides a full QWERTY layout of keys for typing. The user inputs text with the touch-sensitive display 102 by touching individual keys according to the desired text. After inputting information into the text box 814, the user can submit the report by touching the send button 806 as described above. In some implementations, submitting the report causes the user interface to transition to a previous user interface (e.g., application information interface 403).

In some implementations, the keyboard 516 is not presented in the reporting interface 802 until the user selects the text box 814 (e.g., by touching the text box 814).

Figure 9:
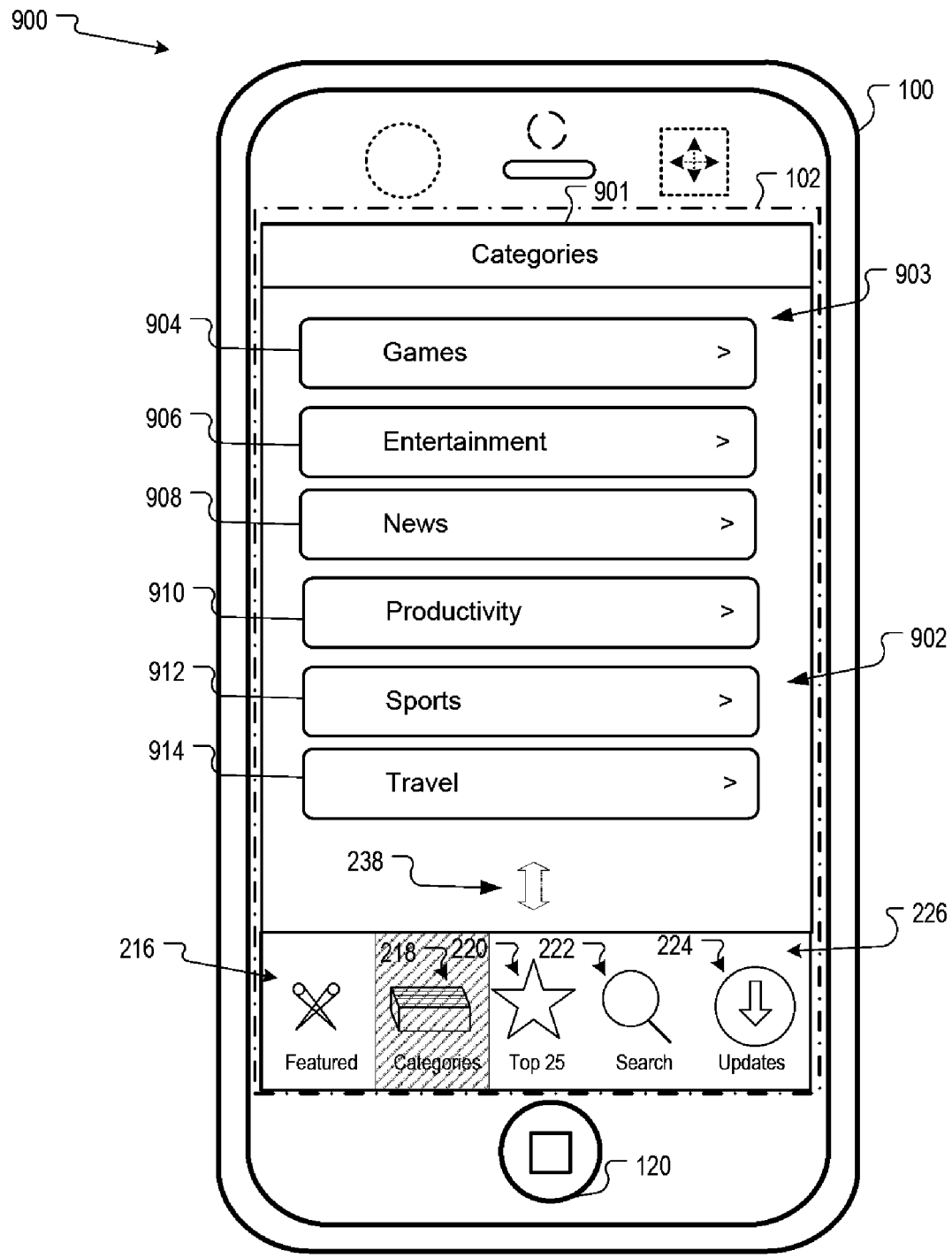
FIG. 9 is a block diagram of an example user interface of the mobile device illustrating an application store following selection of a categories tab.

FIG. 9 is a block diagram 900 of an example user interface of the mobile device 100 illustrating an application store following selection of a categories tab (e.g., categories tab 218 of FIG. 2). For example, the user can access the app store display object 132 using the touch sensitive display 102 (e.g., by pressing the app store display object 132), resulting in a transition to an app store interface. In some implementations, touching the app store display object 132 in FIG. 1 causes an animated transition to the app store interface.

The user interface for the app store includes a display portion 902 and a menu portion 226. The menu portion 226 can include several tabs. In particular, the menu portion 226 includes the featured tab 216, the categories tab 218, the top 25 tab 220, the search tab 222, and the updates tab 224. Each of the tabs in the menu portion 226 can be used to access different features of the application store.

The display portion 236 displays a categories interface 903 associated with the categories tab 218, which is shown as highlighted in the display portion 236. The categories interface 903 includes a title bar 901 identifying the user interface as a categories interface. In some implementations, the title bar 903 includes one or more buttons, for example, a back button allowing the user to access a previous user interface. Alternatively, the user can exit the application store and return to the "home" interface shown in FIG. 1 by pressing button 120.

The categories interface 903 includes one or more category buttons. In particular, the categories interface 903 includes a games button 904, entertainment button 906, news button 908, productivity button 910, sports button 912, and travel button 914. The displayed categories can be arranged in any order (e.g., alphabetical, by popularity, etc.). Additionally, other categories can be displayed in place of or in addition to the categories shown. In some implementations, the user can view additional categories by scrolling 238 the category buttons.

Each category button allows the user to transition to an interface providing application objects associated with the particular category. For example, a selection of the games button 904 can cause the categories interface to transition to an game objects interface that includes one or more application objects corresponding to games or otherwise associated with the games category.

Figure 10:
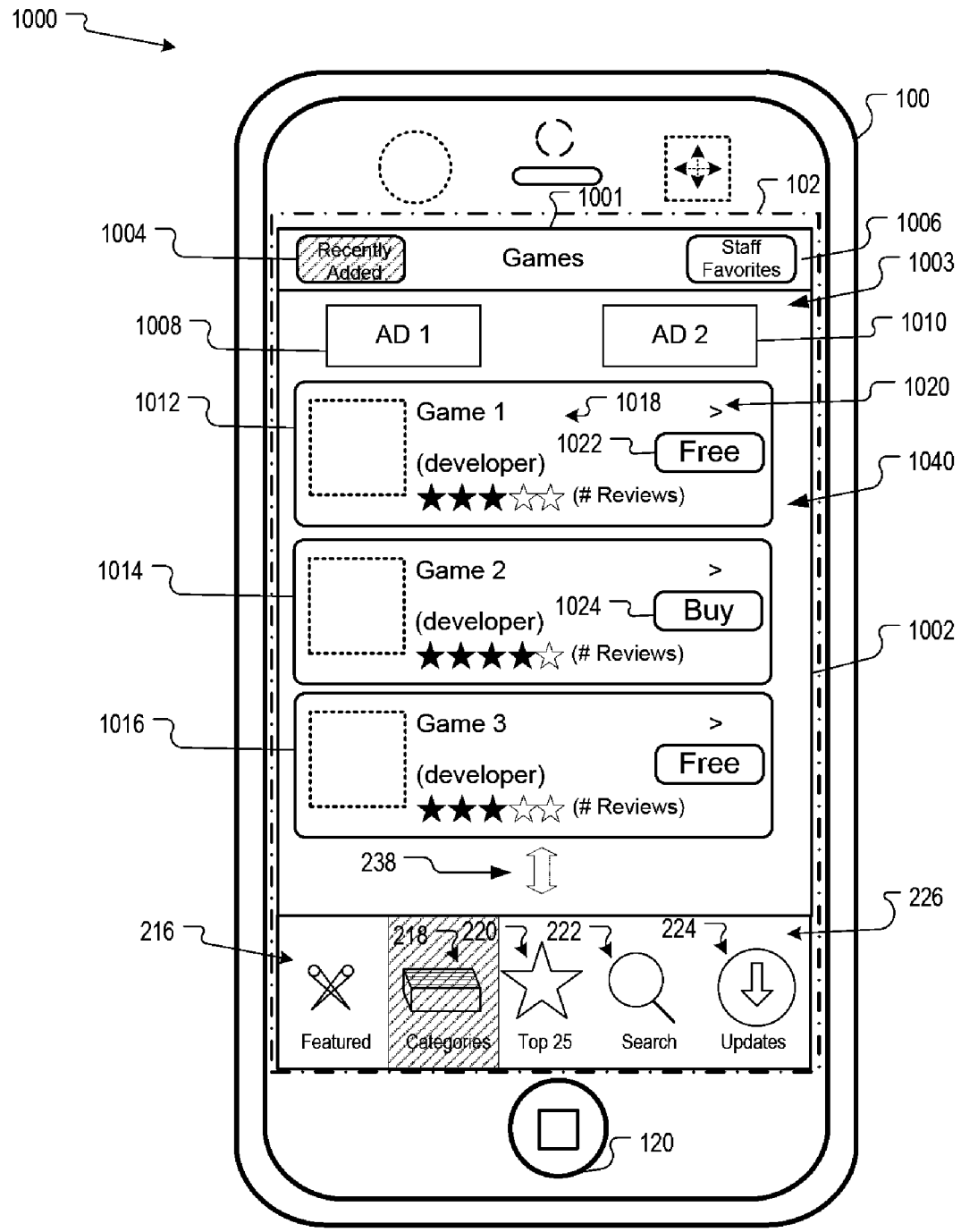
FIG. 10 is a block diagram 1000 of an example user interface of the mobile device 100 illustrating application objects of a particular selected category.

FIG. 10 is a block diagram 1000 of an example user interface of the mobile device 100 illustrating application objects of a particular selected category. In particular, FIG. 10 shows a games objects interface 1003 presented in response to a user category selection (e.g., a user selection of the games button 904 in FIG. 9).

The user interface includes a display portion 1002 and a menu portion 226. The menu portion 226 includes several tabs. In particular, the menu portion 226 includes a featured tab 216, a categories tab 218, a top 25 tab 220, a search tab 222, and an updates tab 224. In particular, the categories tab 218 is shown as highlighted.

The display portion 1002 displays a games objects interface 1003 associated with the selection of a games category. The games objects interface 1003 includes a title bar 1001 including recently added button 1004 and staff favorites button 1006. The recently added button 1004 and staff favorites button 1006 are shown as separate buttons, however, they can take other forms including, for example, a single toggle button that can be switched from one to the other.

The games objects interface 1003 also includes one or more games objects 1040. The recently added button 1004 is shown as currently selected (e.g., based on a user input to the touch-sensitive display 102). When the recently added button 1004 is selected, the games objects 1040 displayed correspond to game applications that have been recently added to the application store in similar manner as described above in FIG. 2, but with respect to games objects. Similarly, when the staff favorites button 1006 is selected or toggled, the games objects 1040 displayed correspond to game applications that have been selected by one or more individuals associated with the app store in a similar manner as described above in FIG. 2.

The game objects 1040 shown in the display portion 1002 include game objects 1012, 1014, and 1016. Additionally, when the display portion 1002 cannot display all of the game objects 1040 at one time, the user can scroll 238 up or down to view additional game objects 1040.

Each game object 1040 includes information associated with the particular game application. For example, game object 1012 includes game application information 1018. The game application information 1018 can include an image representing the game application, the game application name ("Game 1"), a developer's name, and rating information. In some implementations, the rating information is represented by a specified number of stars. Stars are filled to indicate the average rating (e.g., three out of five) of the game. In some implementations, stars can be partially filled to represent a finer degree of granularity of the average rating.

The game objects 1040 also include a purchasing information 1022. The purchasing information 1022 indicates whether the application is free or must be purchased. In some implementations, the purchasing information indicates the cost of the game (e.g., $5.00). In some other implementations, each game object (e.g., game objects 1012, 1014, and 1016) can indicate whether or not the user has already installed the particular game. For example, if the user has already installed the game identified by game object 1012, the purchase information 1022 can read "installed" instead of "free". Alternatively, the purchase information 122 can read "uninstall" indicating that the user can uninstall the already installed game application.

The game objects 1040 can also include an ">" indicator 1020. The indicator 1020 indicates that selecting a particular game object (e.g., by touching game object 1012) transitions the user interface to provide additional information about the selected game application. The transition can be animated.

The display portion 1002 can also include one or more advertisements. In the display portion 1002, a first advertisement 1008 and a second advertisement 1010 are shown near the title bar 1001. In other implementations, only a single advertisement is presented. Alternatively, additional advertisements can be presented. Additionally, while the advertisements are shown near the title bar 1001, one or more advertisements can be presented at different locations on the display portion 1002.

The user can select a particular game object 1040 in order to transition to provide information regarding the game associated with the selected game object. The game information is provided in a similar manner to the application information interface 403 described above with respect to FIG. 4.

Figure 11:
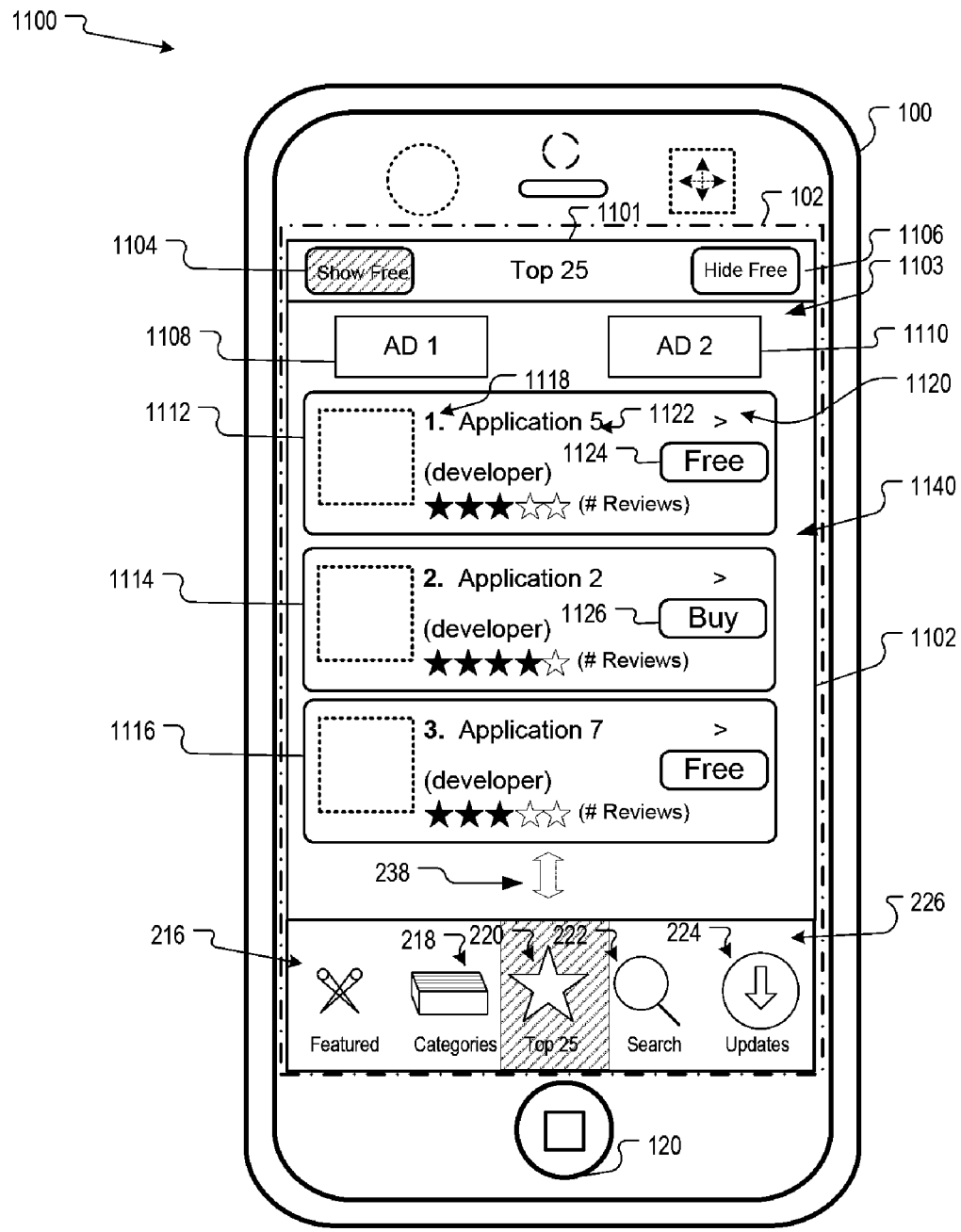
FIG. 11 is a block diagram of an example user interface of the mobile device illustrating an application store following selection of a "top 25" tab.

FIG. 11 is a block diagram 1100 of an example user interface of the mobile device 100 illustrating an application store following selection of a "top 25" tab (e.g., "top 25" tab 220). For example, the user can access the app store display object 132 using the touch sensitive display 102 (e.g., by pressing the app store display object 132), resulting in a transition to an app store interface. In some implementations, touching the app store display object 132 in FIG. 1 causes an animated transition to the app store interface.

The user interface for the app store includes a display portion 1102 and the menu portion 226. The menu portion 226 can include several tabs. In particular, the menu portion 226 includes the featured tab 216, the categories tab 218, the top 25 tab 220, the search tab 222, and the updates tab 224. Each of the tabs in the menu portion 226 can be used to access different features of the application store.

The display portion 1102 displays a "top 25" interface 1103 associated with the "top 25" tab 220, which is shown as highlighted in the display portion 236. The top 25 interface 1103 includes a title bar 1101 identifying the user interface as a top 25 interface. The title bar 1101 also includes a "show free" button 1104 and a "hide free" button 1106.

When the "show free" button 1104 is selected (as is shown by the highlighting in FIG. 11), the "top 25" interface 1103 displays application objects 1140 including those associated with applications available for free. When the "hide free" button 1106 is selected, the "top 25" interface 1103 only displays application objects that require payment.

The "top 25" interface 1103 includes application objects 1140. In particular, 25 application objects 1140 are listed. However, when all 25 application objects 1140 cannot be displayed in the display portion 1102, the user can scroll 238 to view additional application objects. Additionally, in some implementations, when the user scrolls to the bottom of the "top 25" list of application objects a button can be provided to allow the user to view another group of application objects (e.g., a "next 25" application objects).

The application objects 1140 shown include application objects 1112, 1114, and 1116. The application objects 1140 are presented in ranked order. Thus, application object 1112 is ranked above application object 1114. The rank of each application object is identified in the application object. For example, application object 1112 includes a rank identifier 1118 that identifies the application object 1112 as being ranked number one in the list of application objects 1140.

Each application object 1140 includes information associated with the particular application. For example, application object 1112 includes application information 1122. The application information 1122 can include an image representing the application, the application name ("Application 5"), a developer's name, and rating information. In some implementations, the rating information is represented by a specified number of stars. Stars are filled to indicate the average rating (e.g., 3/5) of the game. In some implementations, stars can be partially filled to represent a finer degree of granularity of the average rating.

The application objects 1140 also include a purchasing information 1124. The purchasing information 1124 indicates whether the application is free or must be purchased. In some implementations, the purchasing information indicates the cost of the application (e.g., $5.00). In some other implementations, each application object (e.g., application objects 1112, 1114, and 1116) can indicate whether or not the user has already installed the particular application. For example, if the user has already installed the application identified by application object 1112, the purchase information 1124 can read "installed" instead of "free". Alternatively, the purchase information 1124 can read "uninstall" indicating that the user can uninstall the already installed application.

The application objects 1140 can also each include an ">" indicator 1124. The indicator 1124 indicates that selecting a particular application object (e.g., by touching application object 1112) will transition the user interface to provide additional information about the selected application. The transition can be animated.

The display portion 1102 can also include one or more advertisements. In the display portion 1102, a first advertisement 1108 and a second advertisement 1110 are shown near the title bar 1101. In other implementations, only a single advertisement is presented. Alternatively, additional advertisements can be presented. Additionally, while the advertisements are shown near the title bar 1101, one or more advertisements can be presented at different locations on the display portion 1102.

Selecting a particular application object in the ranked list of application objects 1140 transitions the user interface to an interface providing information regarding the application associated with the selected application object. The application information is provided in a similar manner to the application information interface 403 described above with respect to FIG. 4.

Figure 12:
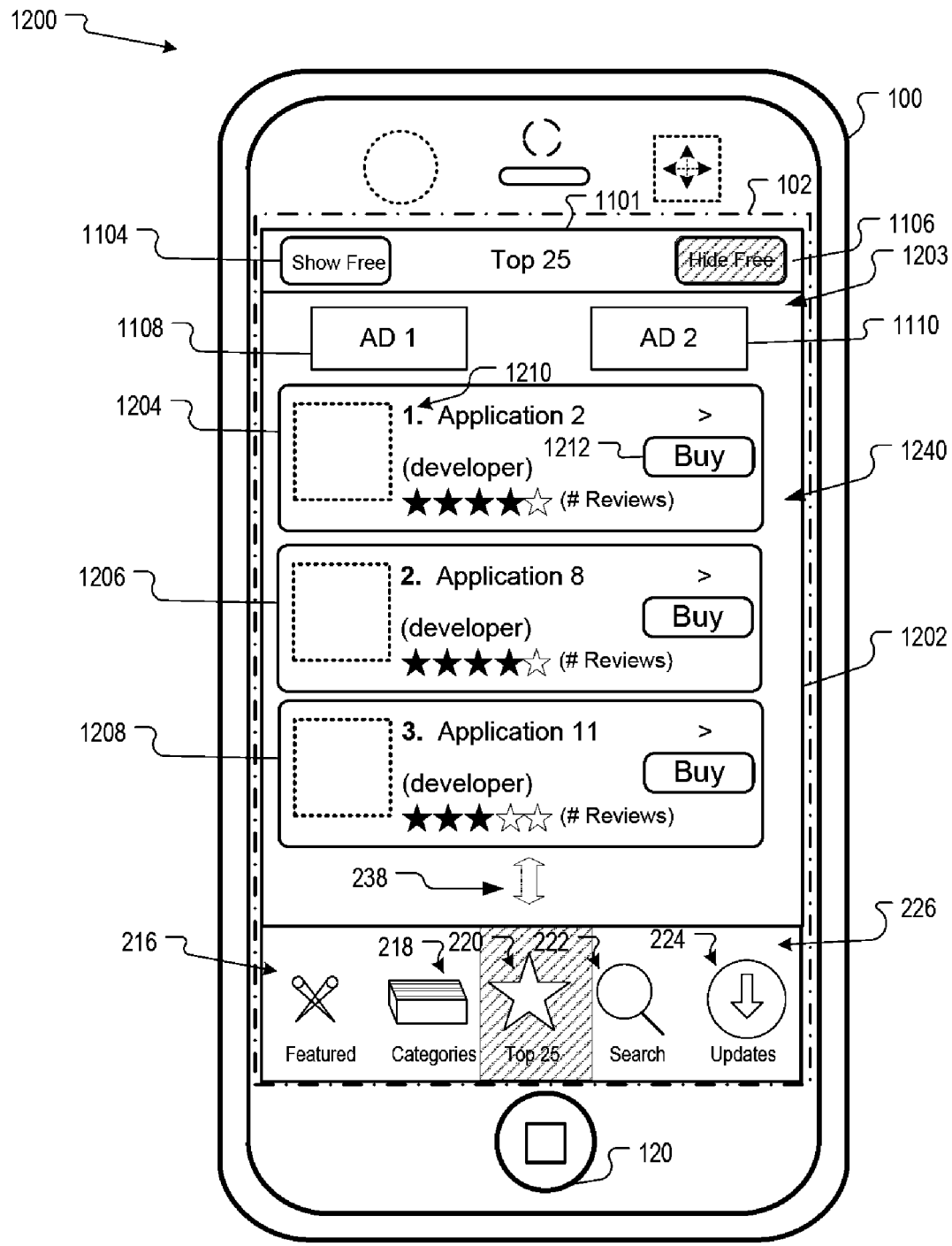
FIG. 12 is a block diagram of an example user interface of the mobile device illustrating an application store "top 25" with free applications hidden.

FIG. 12 is a block diagram 1200 of an example user interface of the mobile device 100 illustrating an application store "top 25" with free applications hidden. The user interface for the app store includes a display portion 1202 and the menu portion 226. The menu portion 226 can include several tabs. In particular, the menu portion 226 includes the featured tab 216, the categories tab 218, the top 25 tab 220, the search tab 222, and the updates tab 224. Each of the tabs in the menu portion 226 can be used to access different features of the application store.

The display portion 1202 displays a "top 25" interface 1203 associated with the "top 25" tab 220, which is shown as highlighted in the display portion 236. The top 25 interface 1103 includes a title bar 1201 identifying the user interface as a "top 25" interface. The title bar 1201 also includes the "show free" button 1104 and the "hide free" button 1106. In particular, the "hide free" button 1106 is selected, as shown by the highlighting in FIG. 12. When the "hide free" button 1106 is selected, the "top 25" interface 1203 only displays application objects which require payment.

The "top 25" interface 1203 includes application objects 1240. In particular, up to 25 application objects 1240 are listed. However, when there are more application objects 1240 than can be displayed in the display portion 1202, the user can scroll 238 to view additional application objects. Additionally, in some implementations, when the user scrolls to the bottom of the "top 25" list of application objects a button can be provided to allow the user to view another group of application objects (e.g., a "next 25" application objects).

The application objects 1240 shown include application objects 1204, 1206, and 1208. The application objects 1240 are presented in a ranked order. Thus, application object 1204 is ranked above application object 1206. The rank of each application object is identified in the application object. For example, application object 1204 includes a rank identifier 1210 that identifies the application object 1204 as being ranked number one in the list of application objects 1240. The ranking can be based, for example, on the average star rating of each application or some other criteria.

Each application object 1240 includes information associated with the particular application. For example, the application objects 1240 can include an image representing the application, the application name (e.g., "Application 2"), a developer's name, and rating information.

The application objects 1240 also include a purchasing information 1212. In particular, since the "hide free" button 1106 is selected or toggled, each of the application objects 1240 requires payment. Selecting a particular application object in the ranked list of application objects 1240 transitions the user interface to an interface providing information regarding the application associated with the selected application object. The application information is provided in a similar manner to the application information interface 403 described above with respect to FIG. 4.

Figure 13:
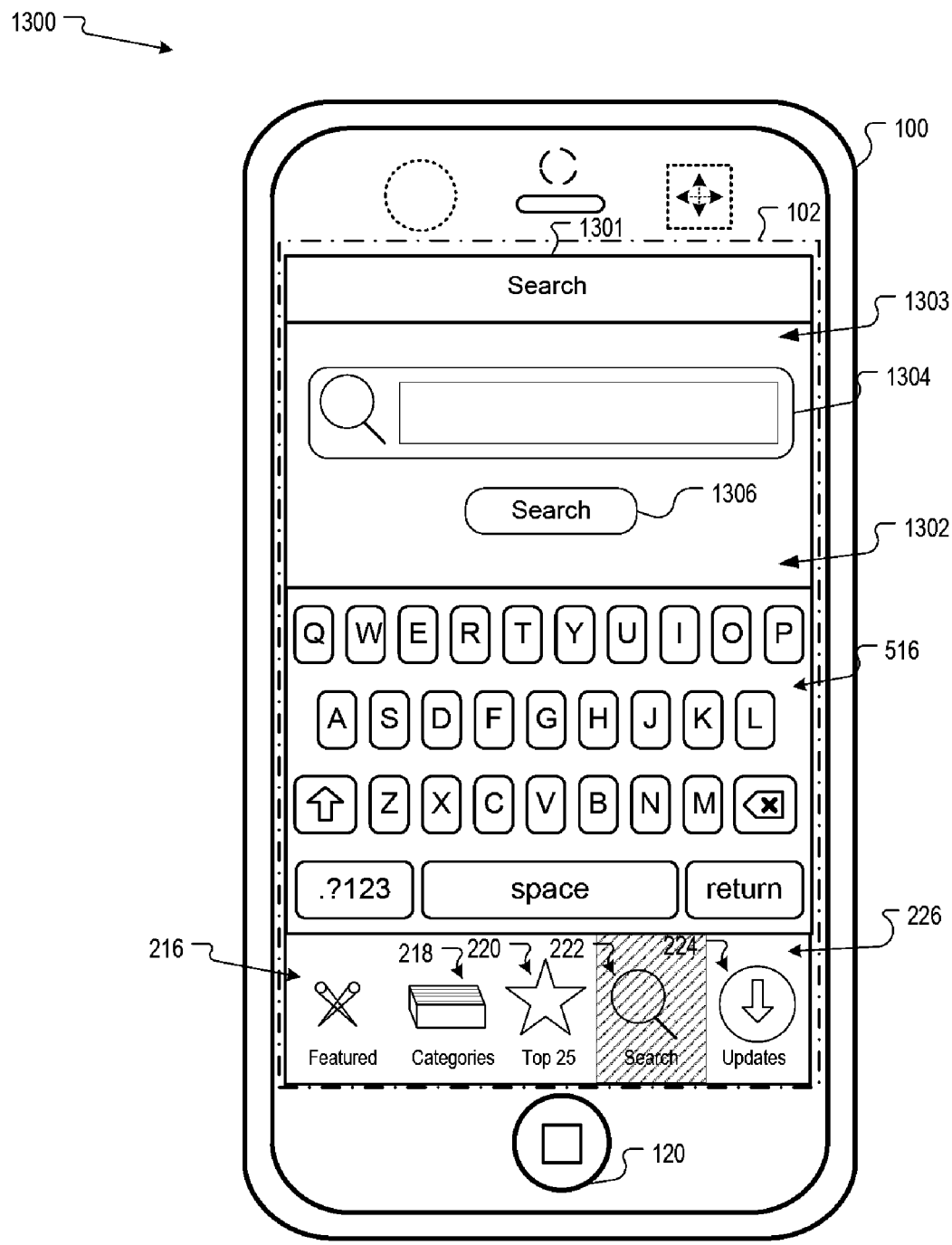
FIG. 13 is a block diagram of an example user interface of the mobile device illustrating an application store following selection of a search tab.

FIG. 13 is a block diagram 1300 of an example user interface of the mobile device 100 illustrating an application store following selection of a search tab. For example, the user can access the app store display object 132 using the touch sensitive display 102 (e.g., by pressing the app store display object 132), resulting in a transition to an app store interface. In some implementations, touching the app store display object 132 in FIG. 1 causes an animated transition to the app store interface.

The user interface for the app store includes a display portion 1302 and the menu portion 226. The menu portion 226 can include several tabs. In particular, the menu portion 226 includes the featured tab 216, the categories tab 218, the top 25 tab 220, the search tab 222, and the updates tab 224. Each of the tabs in the menu portion 226 can be used to access different features of the application store.

In particular, the display portion 1302 displays a search interface 1303 associated with the search tab 222, which is shown as highlighted in the display portion 236. The search interface 1303 includes a title bar 1201 identifying the user interface as an application search interface.

The search interface 1303 includes a search field 1304 and a search button 1306. The search field 1304 allows a user to input one or more search terms. For example, the user can input keywords identifying a particular application, developer, category, or other keywords. The search button 1306 executes an application search based on the user input to the search field 1304. For example, the user can execute the search by touching the search button 1306.

The user can input search terms into the search field 1304 using keyboard 516. The keyboard 516 provides a full QWERTY layout of keys for typing. The user inputs text with the touch sensitive display 102 by touching individual keys according to the desired text.

Executing a search (e.g., by touching the search button 1306) transitions the user interface to an interface providing information regarding one or more applications associated with the input search terms. The application information is provided in a similar manner to the application information interface 403 (e.g., as a list of application objects) as described above with respect to FIG. 4.

Figure 14:
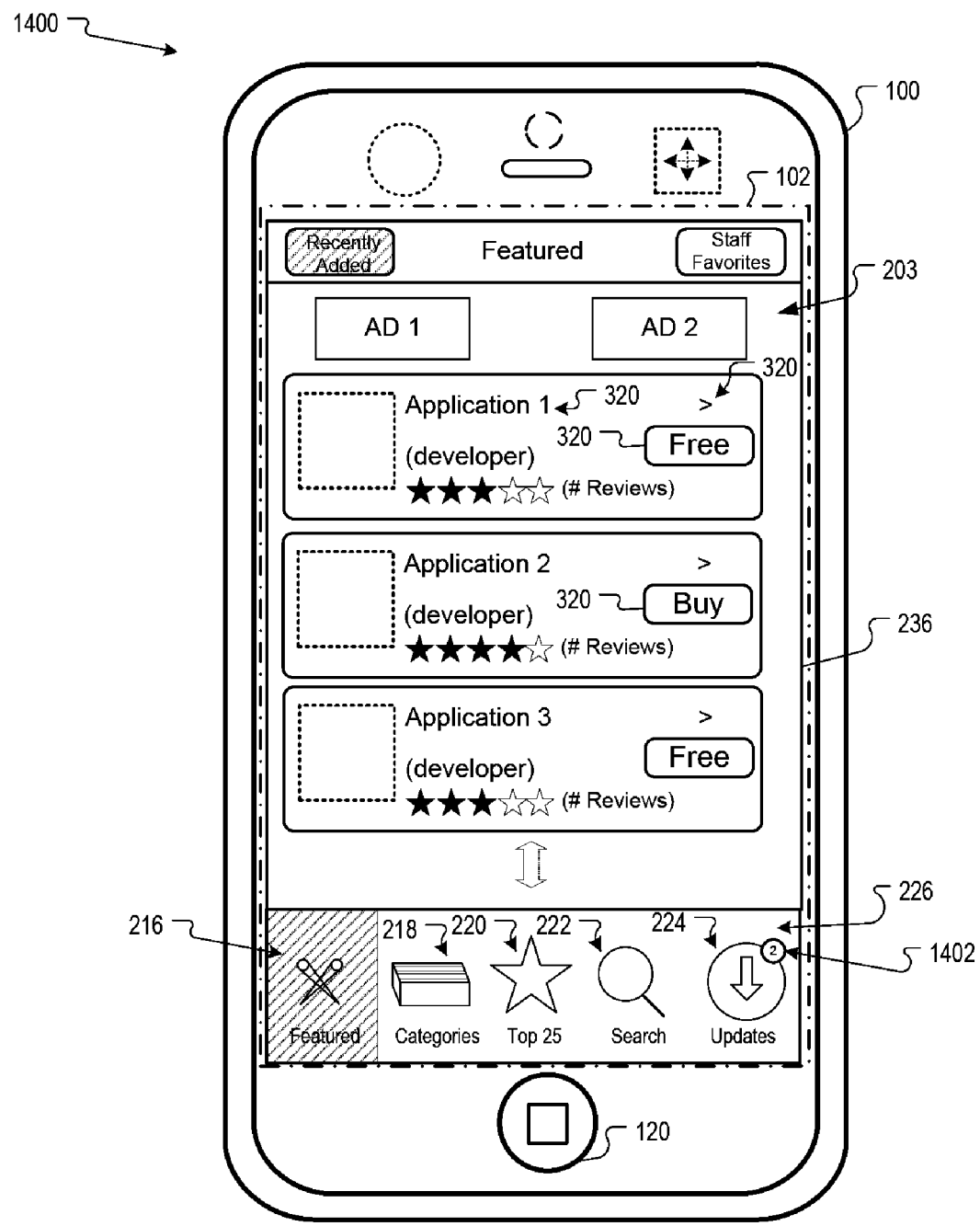
FIG. 14 is a block diagram of an example user interface of the mobile device after invoking an application store display object and illustrating available updates.

FIG. 14 is a block diagram 1400 of an example user interface of the mobile device 100 after invoking an application store display object and illustrating available updates. For example, the user can access the app store display object 132 using the touch sensitive display 102 (e.g., by pressing the app store display object 132), resulting in a transition to an application store interface. In some implementations, touching the application store display object 132 in FIG. 1 causes an animated transition to the app store interface.

The user interface for the application store includes the display portion 236 and the menu portion 240. The menu portion 226 includes several tabs. In particular, the menu portion 226 includes the featured tab 216, the categories tab 218, the top 25 tab 220, the search tab 222, and the updates tab 224. Each of the tabs in the menu portion 226 can be used to access different features of the application store.

The display portion 236 displays a featured interface 203 associated with the featured tab 216, which is shown as highlighted in the display portion 236. The featured interface 203 including application objects is described above with respect to FIG. 2.

The updates tab 224 includes an updates badge 1402. The updates badge 1402 identifies whether or not there are updates available to the applications installed on the mobile device 100. The user can identify whether there are available updates without selecting the updates tab 224. For example, the updates badge 1402 can be a symbol or graphic associated with the updates tab 224. As shown in FIG. 14, the updates badge 1402 is a circle with a number inside that is superimposed over a portion of the graphic identifying the updates tab 224. Additionally, the updates badge 1402 can be visible only when an update is available. In some implementations, the updates badge indicates the number of available updates (e.g., by including a number in the badge). For example, updates badge 1402 shows that there are two updates available.

Figure 15:
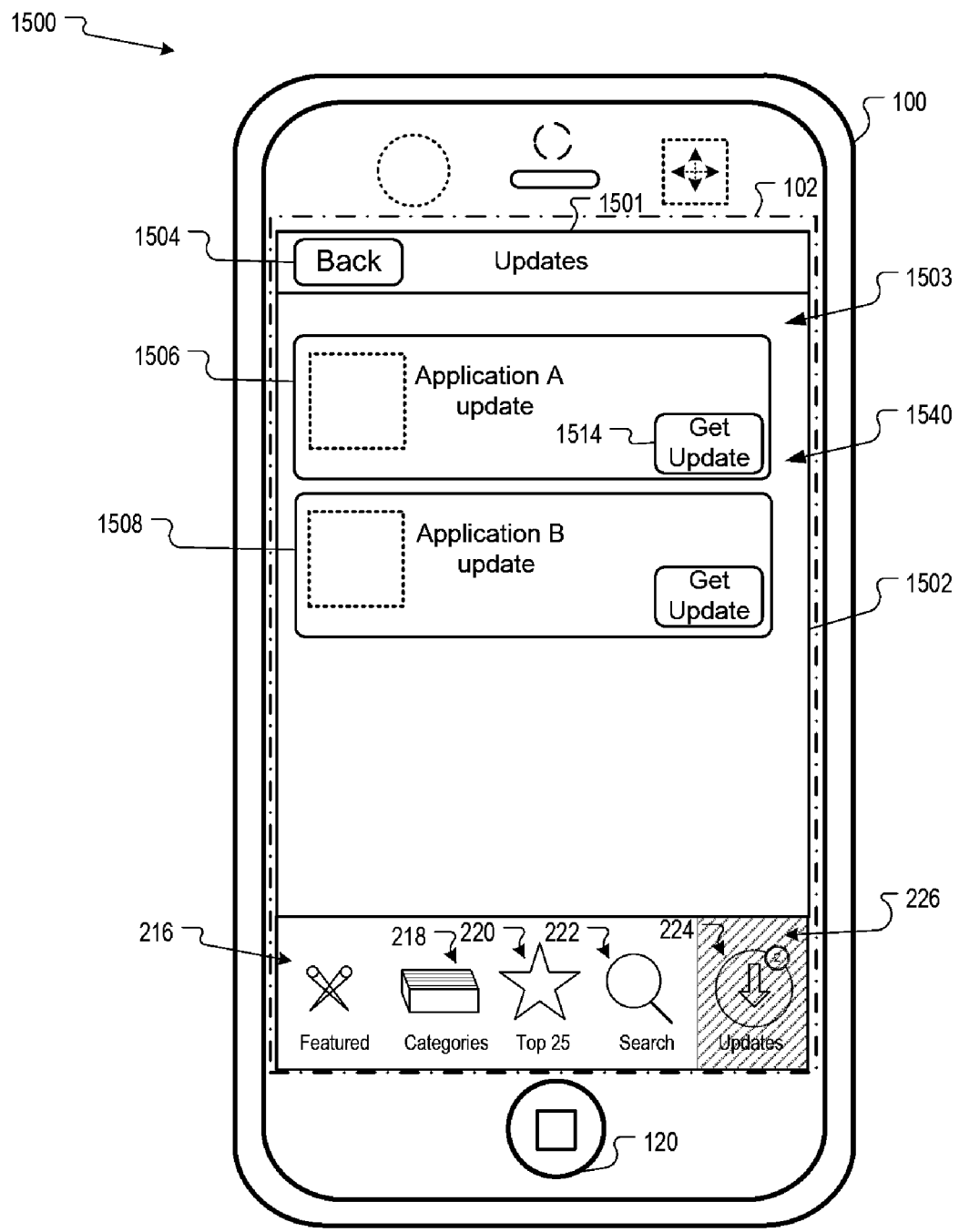
FIG. 15 is a block diagram of an example user interface of the mobile device illustrating an application store following selection of an updates tab.

FIG. 15 is a block diagram of an example user interface 1500 of the mobile device 100 illustrating an application store following selection of an updates tab (e.g., updates tab 224). For example, the user can access the app store display object 132 using the touch sensitive display 102 (e.g., by pressing the app store display object 132), resulting in a transition to an app store interface. In some implementations, touching the app store display object 132 in FIG. 1 causes an animated transition to the app store interface.

The user interface for the app store includes a display portion 1102 and the menu portion 226. The menu portion 226 can include several tabs. In particular, the menu portion 226 includes the featured tab 216, the categories tab 218, the top 25 tab 220, the search tab 222, and the updates tab 224. Each of the tabs in the menu portion 226 can be used to access different features of the application store.

The display portion 1502 displays an updates interface 1503 associated with the updates tab 224, which is shown as highlighted in the display portion 236. The updates interface 1503 includes a title bar 1501 identifying the user interface as an updates interface. The title bar 1501 also includes an optional back button 1504. The back button 1504 allows the user to exit the updates interface 1503 or the application store and to return to an earlier user interface. Alternatively, the user can exit the application store and return to the "home" interface shown in FIG. 1 by pressing button 120.

The updates interface 1503 includes update objects 1540. In particular, two update objects 1506 and 1508 are shown in the updates interface 1503, which corresponds to the number of updates identified by the updates badge 1402 in FIG. 14. In some other implementations, there are more update objects 1540 than are displayable in the display portion 1502. When there are additional update objects 1540 than can be displayed, the user can scroll to view additional update objects. Additionally, in some implementations, when the user can be presented with a button to allow the user to view another group of update objects (e.g., a next 25 update objects) either after scrolling or without any scrolling.

In some implementations, the update objects 1540 identify particular updates available for applications already installed on the mobile device 100. For example, the update object 1506 identifies an update to "Application A" while the update object 1508 identifies an update to "Application B". The user can select the particular update object (e.g., by touching the update object or an associated update button 1514). Selecting the update object can indicate the update download. Alternatively, selecting the update object can transition the updates interface 1503 to an information interface that provides additional information about the update, after which the user can decide whether or not to get the update. In some implantations, a select all button is provided in the updates interface 1503 allowing the user to get all application updates associated with the displayed update objects 1540.

Upon selecting one or more of the update objects 1503 for download, the updates interface 1503 can end, restoring a previous interface or returning the user to the home screen. Alternatively, when a user selects a particular update object (e.g., update object 1506), that object disappears from the update interface 1503 (e.g., only the update object 1508 would remain).

Figure 16:
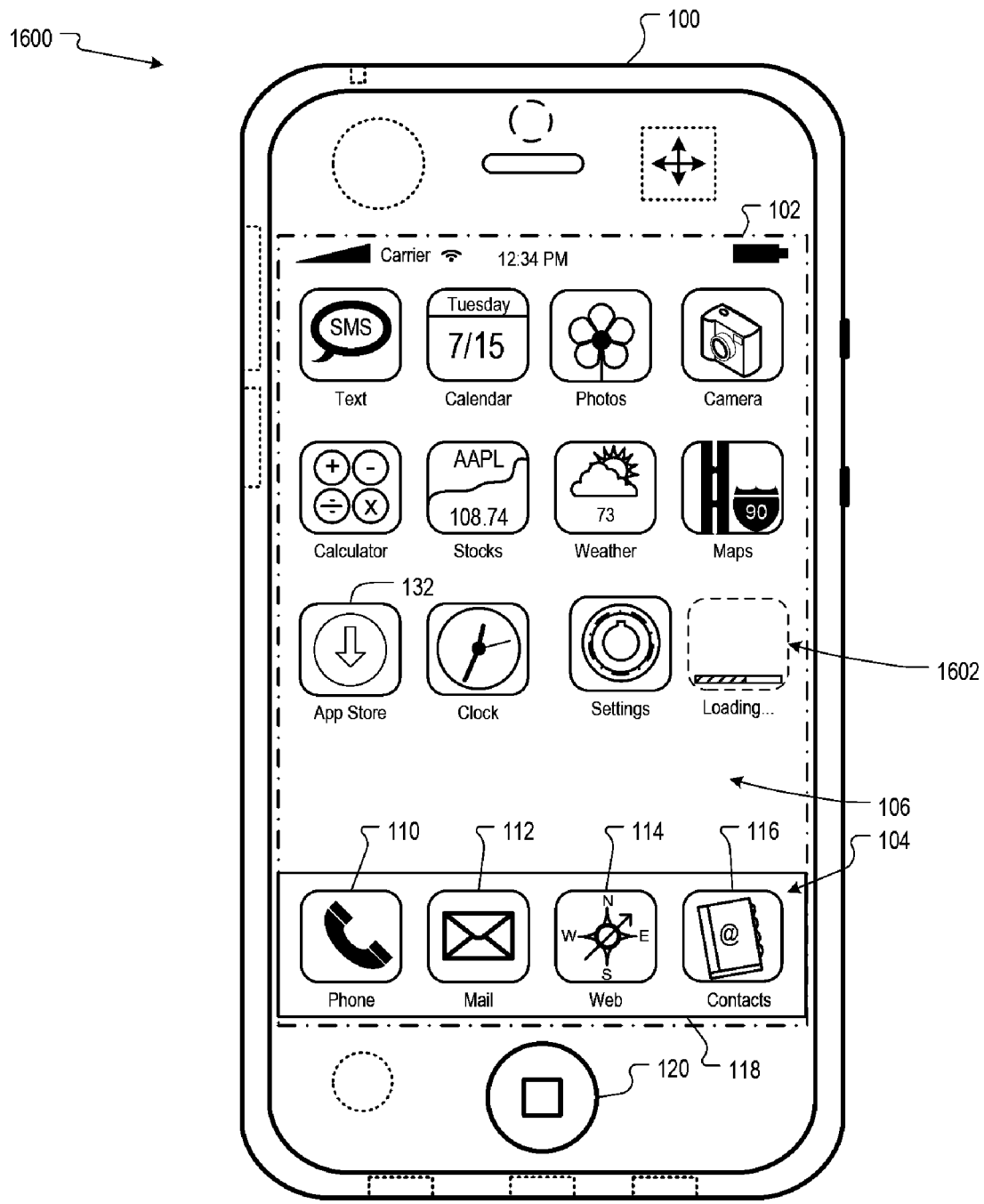
FIG. 16 is a block diagram of an example user interface of the mobile device illustrating an application download.

FIG. 16 is a block diagram 1600 of an example user interface of the mobile device 100 illustrating an application download. For example, the user can select a particular application in the app store, for example, as described above. When the user selects an application object to download, the user interface can transition to the home screen including display objects 104 and 106 as described above with respect to FIG. 1.

Additionally, a download object 1602 is presented as one of the display objects 106. The download object presents a dimmed or shaded object placeholder for the application being downloaded. The download object 1602 is positioned in the next available location relative to the other display objects 106. In particular, the download object includes a "loading . . ." indicator instead of the application title as well as a loading bar. The loading bar can animate to show the progress of the download. Once the download of the application is complete, the "loading . . ." changes to the application title and the image presented in the download object 1602 is modified to correspond to the downloaded application.

Figure 17:
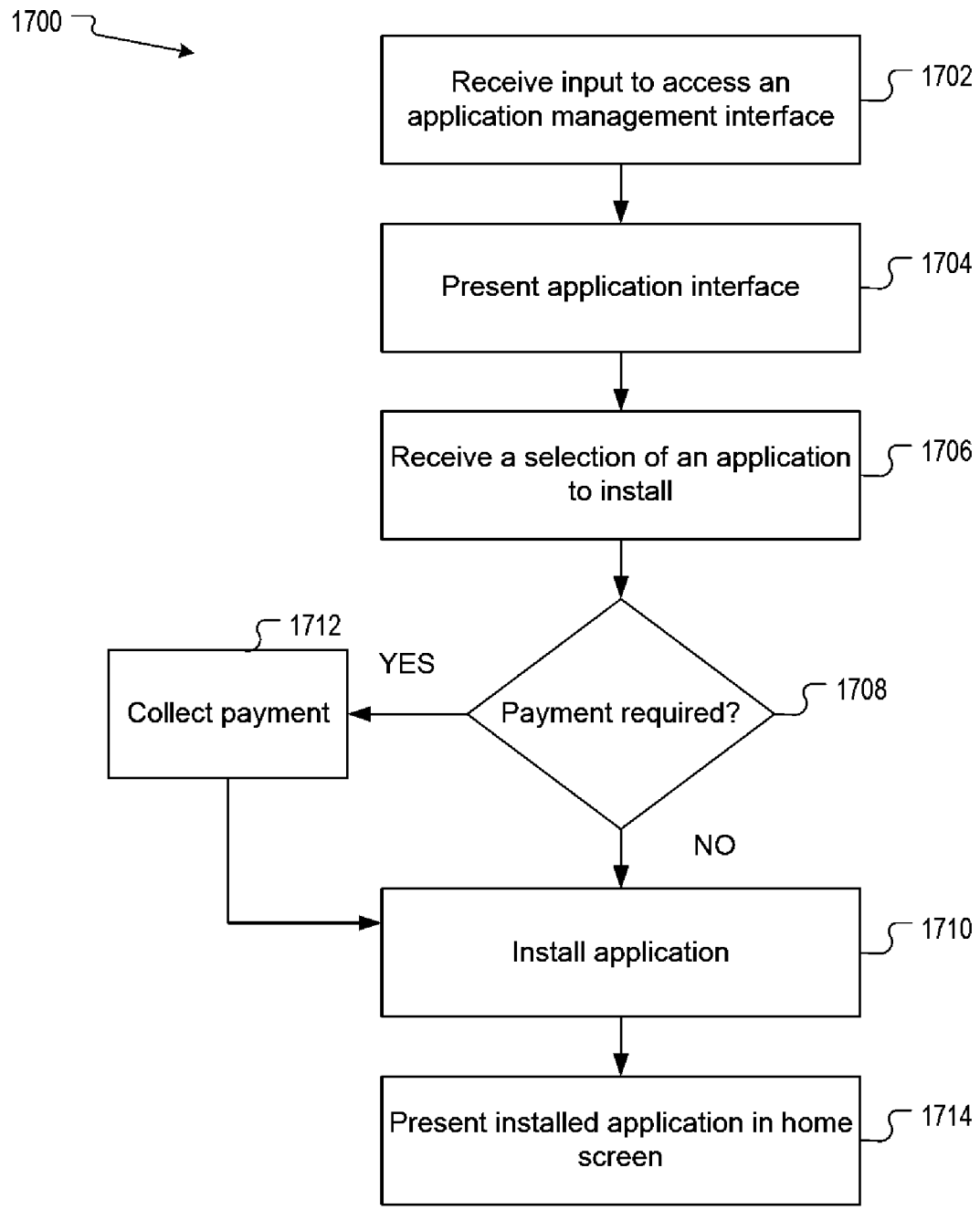
FIG. 17 is a flowchart illustrating an example process for navigating an application store using a mobile device.

FIG. 17 is a flowchart illustrating an example process 1700 for navigating an application store using a mobile device. An input is provided to a mobile device requesting an application management interface (step 1702). For example, the user can select (e.g., using a touch-sensitive display) an application store object as shown, e.g., in FIG. 1.

An application management interface is presented (step 1704). For example, one or more user interfaces can be presented in association with an application store. The application management interface can include buttons, toggles, or other user activated elements that allow the user to navigate between different user interfaces, identify and select application objects, and review and report applications as shown, for example, in FIGS. 2-15.

An input is received selecting a particular application for installation (step 1706). The input can be received, for example, from a user touching a touch-sensitive display (e.g., touch-sensitive display 102 of FIG. 1). For example, the user can search for or identify an application in the presented application management interface using different criteria or listings provided by the application management interface. The user can select the particular application using a touch-sensitive display by touching a displayed application object corresponding to the particular application.

In some other implementations, other user inputs can be received. For example, an input can be received reviewing an application, reporting a problem with an application, notifying others about an application, or updating a previously installed application.

A determination is made as to whether a payment is required for the selected application (step 1708). Some applications can be free to any user while other applications require payment. If payment is not required, the application is installed on the mobile device (step 1710).

If payment is required, the payment is collected (step 1712). The payment can be received, for example, by charging a user account, redeeming a coupon or other credit, or by receiving an electronic payment (e.g., by credit card) from the user. In some implementations, authentication is performed to verify the user.

The application is presented in a home screen of the mobile device (step 1714). The application can be presented as an object on the home screen. In some implementations, while the application is being installed, a placeholder object is positioned on the home screen (e.g., in a next available location on the home screen). The placeholder object can be dimmed and include other indications that the application is not yet available (e.g., providing loading text). The placeholder object can indicate the progress of the installation (e.g., using a loading bar animation).

In some implementations, the application store can include one or more applications that are location specific. For example, corporations or other entities can develop and provide applications within the network, which are not accessible to those outside the local network. In some other implementations, parental controls can be activated (e.g., using settings for the mobile device) to limit access to applications or particular types of applications in the application store.

Figure 18:
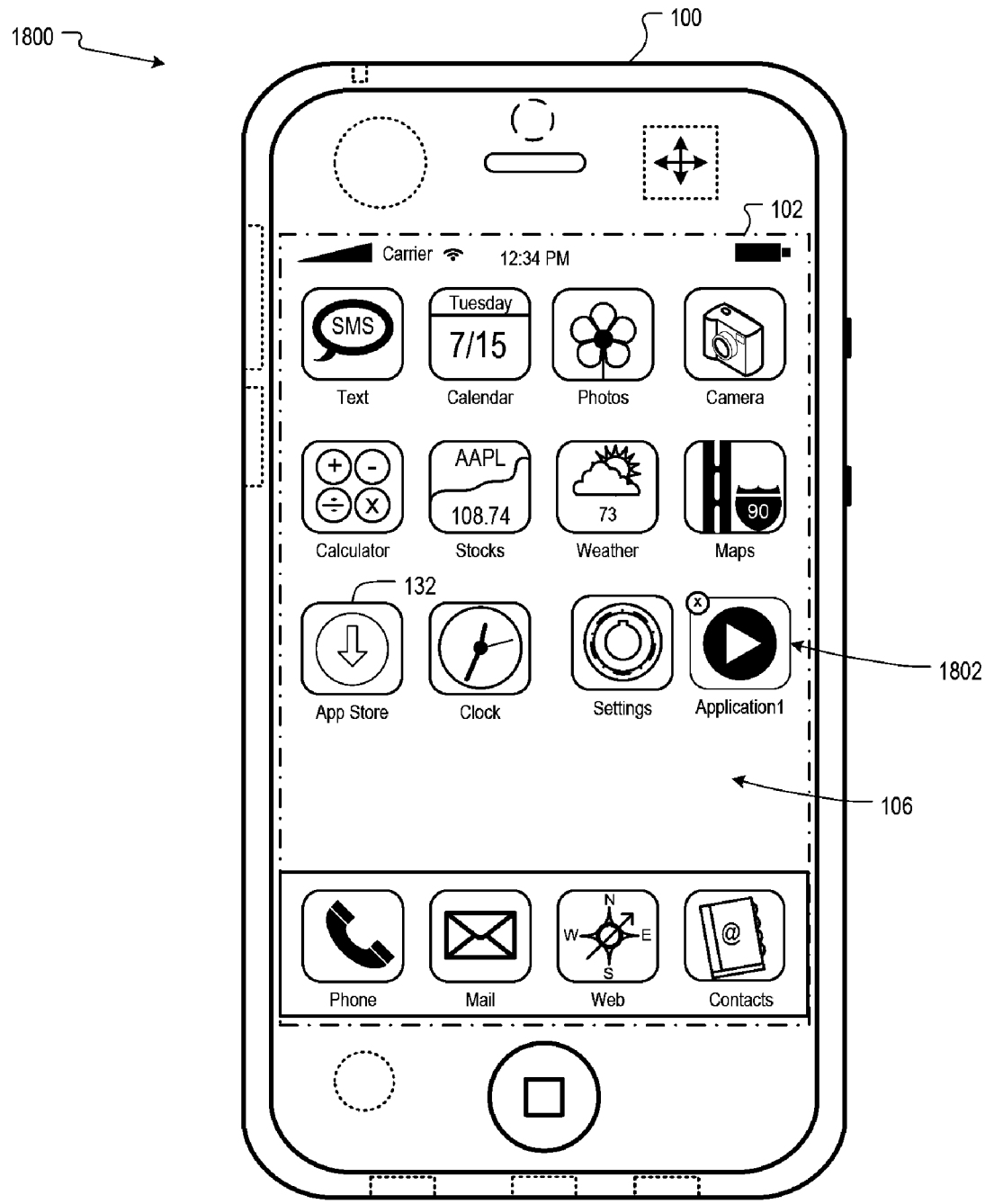
FIG. 18 is a block diagram of an example user interface of the mobile device illustrating an application available for deletion.

FIG. 18 is a block diagram 1800 of an example user interface of the mobile device 100 illustrating an application available for deletion. The user can identify applications available for deletion, for example, by selecting a display object 106 (e.g., using a touch-sensitive display). For example, the user can touch and hold a display object 106 corresponding to a particular application (e.g., application 1802) for a specified period of time to enter an editing mode.

In response to holding the application, the held application along with one or more other display objects 106 can become editable (e.g., movable to other locations on the touch-sensitive display 102. Some display objects 106 can be deleted. The system can present an indicator in the editing mode identifying those display objects, for example, a badge with an "X" presented for those display objects that can be deleted. As shown in FIG. 18, "Application1" 1802 has a badge indicating that this application can be deleted. The user can select the badge (e.g., by touching the "X" on the touch-sensitive display 102) in order to initiate a deletion process for the application.

Figure 19:
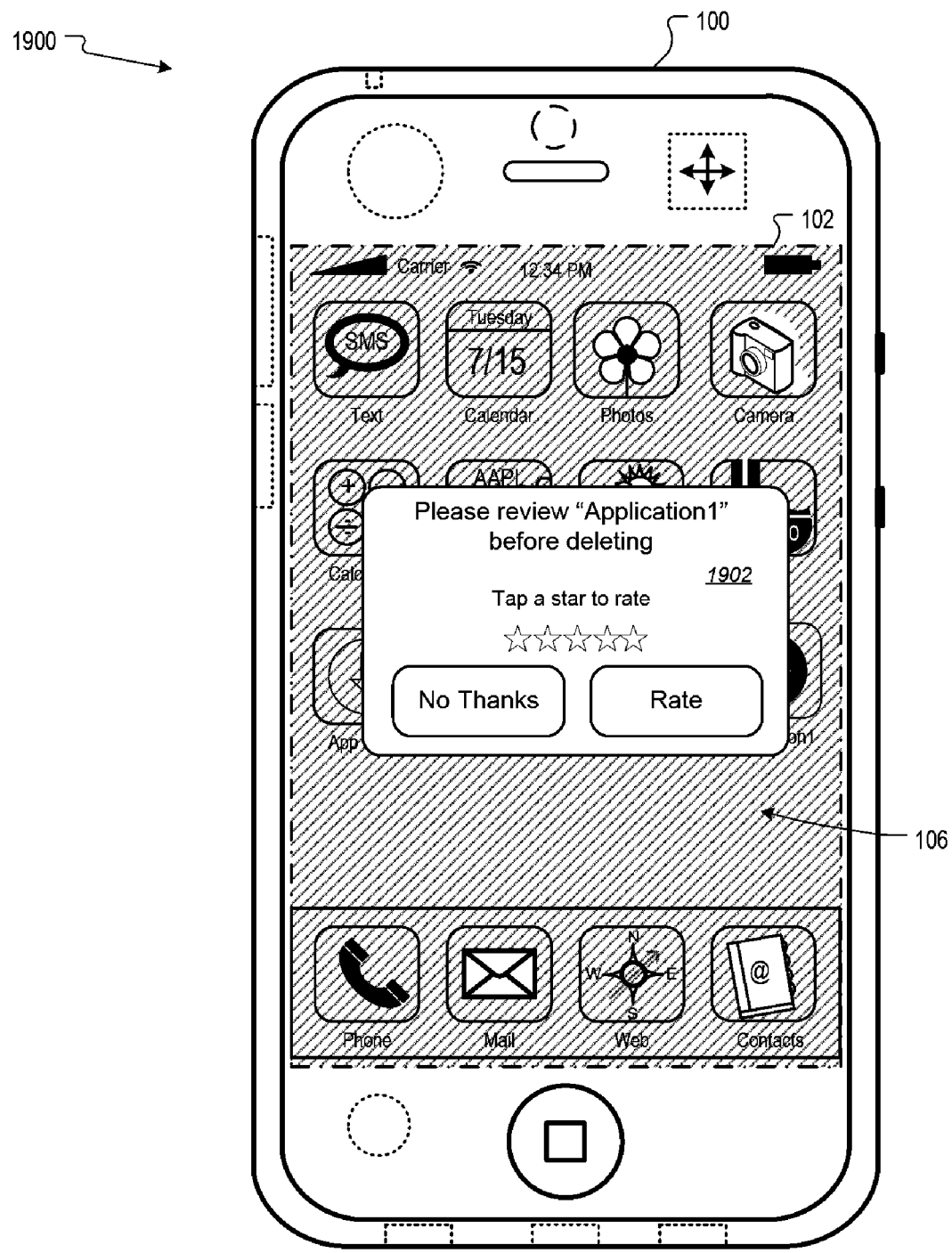
FIG. 19 is a block diagram of an example user interface of the mobile device illustrating a rating prompt.

FIG. 19 is a block diagram 1900 of an example user interface of the mobile device 100 illustrating a rating prompt 1902. When a user selects an application for deletion (e.g., application 1802 of FIG. 18), the rating prompt 1902 can be displayed, for example, on the user-interface provided by the touch-sensitive display 102. In some implementations, the portion of the user interface outside of the rating prompt 1902 can be dimmed relative to the rating prompt 1902.

The rating prompt 1902 can include a request to review the application, a rating scale (e.g., a set of stars), and one or more buttons (e.g., to submit a rating or to decline rating the application). The user can provide an input (e.g., using the touch-sensitive display 102) that indicates a particular rating (e.g., by selecting a particular number of stars). Once the user has selected a particular number of stars, the user can submit the rating using, e.g., a "rate" button. Alternatively, the user can decline to rate the application, for example, by selecting a "no thanks" button.

Figure 20:
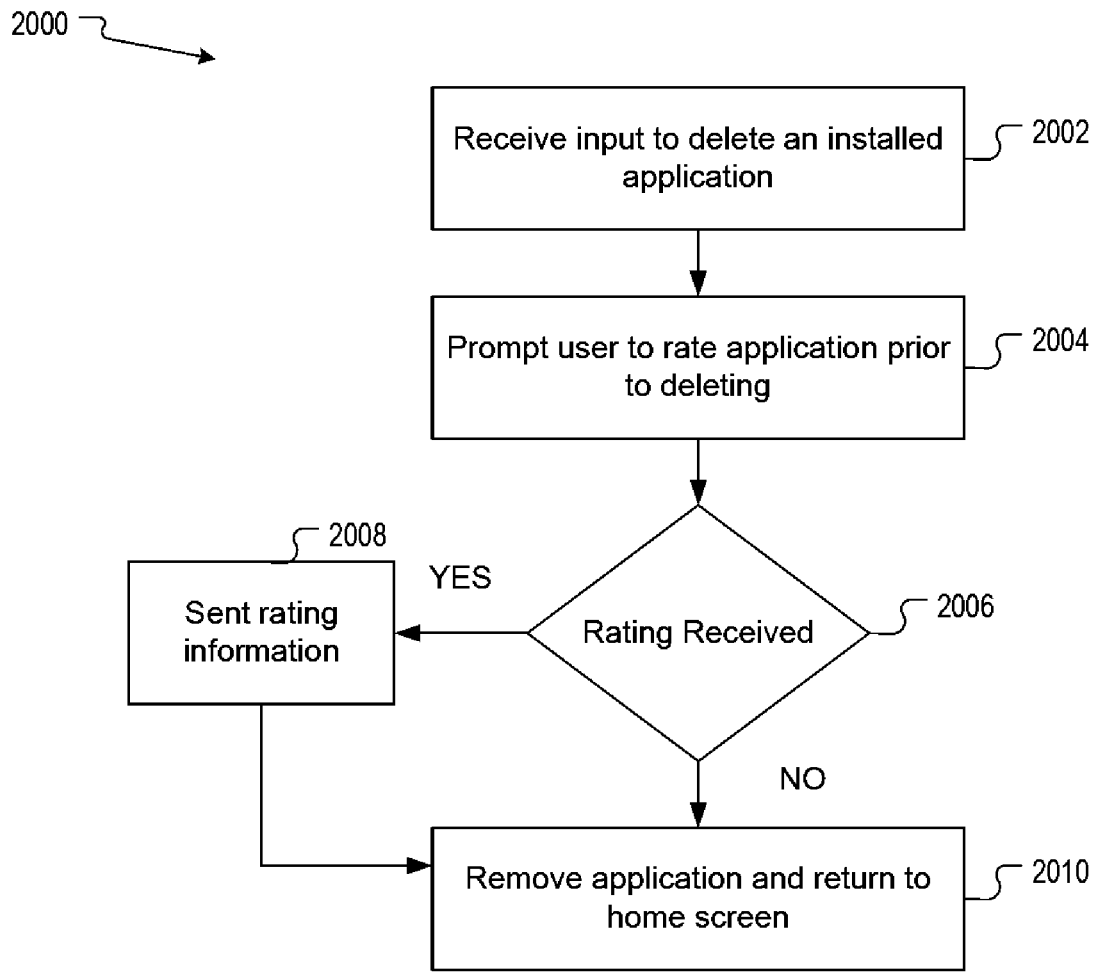
FIG. 20 is a flowchart illustrating an example process for deleting an installed application using a mobile device.

FIG. 20 is a flowchart illustrating an example process 2000 for deleting an installed application using a mobile device. An input is received to delete an installed application (step 2002). The input can be received, for example, from a user touching a touch-sensitive display (e.g., touch-sensitive display 102 of FIG. 18). For example, the user can select a particular application and provide an input indicating that the selected application should be deleted. In some implementations, the user can enter an editing mode that allows the user to identify applications that can be deleted as well as select a particular application for deletion.

In some implementations, when a user selects an application for deletion, a confirmation prompt can be presented to the user. The confirmation prompt can indicate that continuing will delete the application including any saved data associated with the application. The conformation prompt can further provide an opportunity for the user to cancel the deletion process.

A rating prompt is presented (step 2004). The ratings prompt can be presented prior to completing the deletion of the selected application. The ratings prompt allows the user to provide feedback for the application being deleted. For example, the user can input a rating for the application (e.g., by selecting a specified number of stars).

A determination is made as to whether the user rated the application (step 2006). The determination can be made according to one or more user inputs. For example, based on whether the user entered a rating or selected a button indicating that a rating has been provided. Alternatively, the user input can indicate that no rating is being provided. For example, the user can select a button indicating that no rating is being provided.

If the determination is made that a rating has been provided, the rating information is sent to a remote location (step 2008). For example, the rating information can be sent to an application store located at a remote location (e.g., the application store described above). After sending the rating information, the application is removed and the user interface can return to a home screen or other default interface (step 2010).

If the determination is made that a rating has not been provided, the application is removed and the user interface can return to a home screen or other default interface (step 2010).

Network Operating Environment

Figure 21:
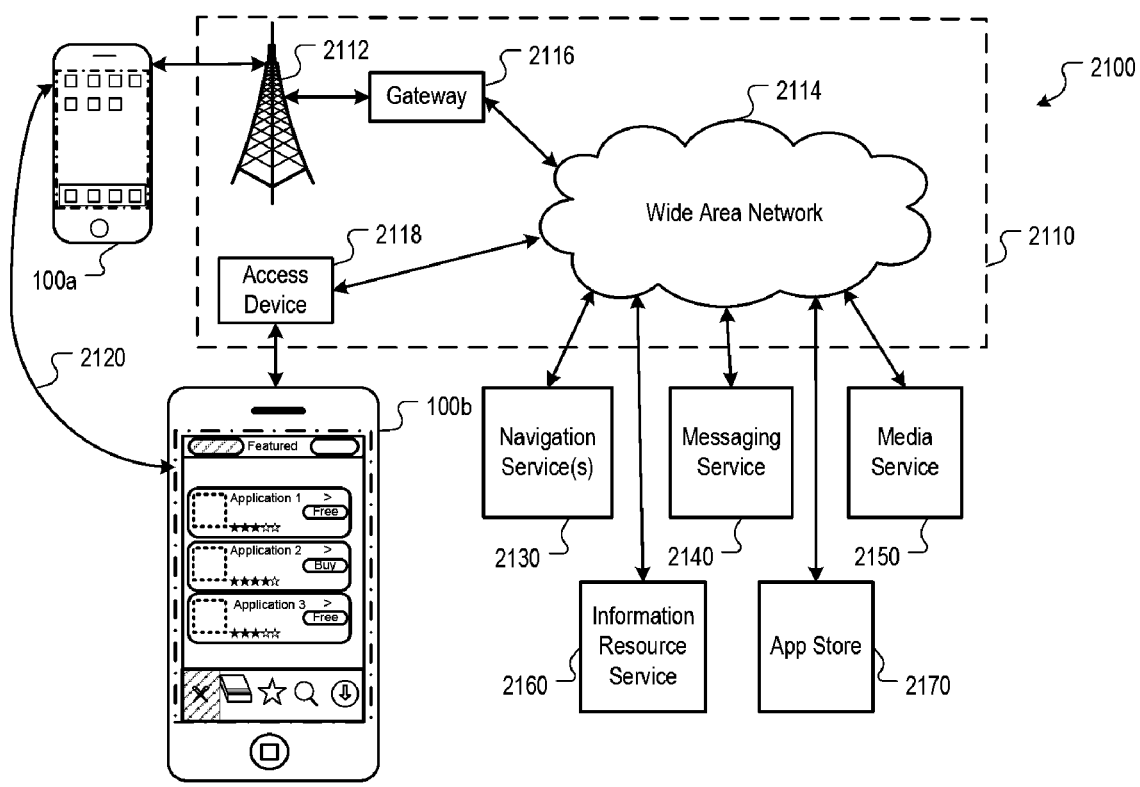
FIG. 21 is a block diagram of an example network operating environment for the mobile device of FIG. 1.

FIG. 21 is a block diagram of an example network operating environment 2100 for the mobile device 100 of FIG. 1. The mobile device 100 of FIG. 1 can, for example, communicate over one or more wired and/or wireless networks 2110 in data communication. For example, a wireless network 2112, e.g., a cellular network, can communicate with a wide area network (WAN) 2114, such as the Internet, by use of a gateway 2116. Likewise, an access point 2118, such as an 802.11g wireless access point, can provide communication access to the wide area network 2114. In some implementations, both voice and data communications can be established over the wireless network 2112 and the access point 2118. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 2112, gateway 2116, and wide area network 2114 (e.g., using TCP/IP or UDP protocols). Likewise, the mobile device 100b can place and receive phone calls, send and receive e-mail messages, and retrieve electronic documents over the access point 2118 and the wide area network 2114. In some implementations, the mobile device 100 can be physically connected to the access point 2118 using one or more cables and the access point 2118 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 2112. Likewise, the mobile devices 100a and 100b can establish peer-to-peer communications 2120, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 2130, 2140, 2150, and 2160 and/or one or more content publishers 2170 over the one or more wired and/or wireless networks 2110. For example, a navigation service 2130 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 2140 can, for example, provide e-mail and/or other messaging services. A media service 2150 can, for example, provide access to media files, such as song files, movie files, video clips, and other media data. One or more other services 2160 can also be utilized by the mobile device 100.

The mobile device 100 can also access other data and content over the one or more wired and/or wireless networks 2110. For example, an application store 2170, can be accessed by the mobile device 100 to provide applications. Such access can be provided by invocation of a web browsing function or application (e.g., a browser) in response to a user touching a web object on the home screen of the mobile device 100.

Exemplary Mobile Device Architecture

Figure 22:
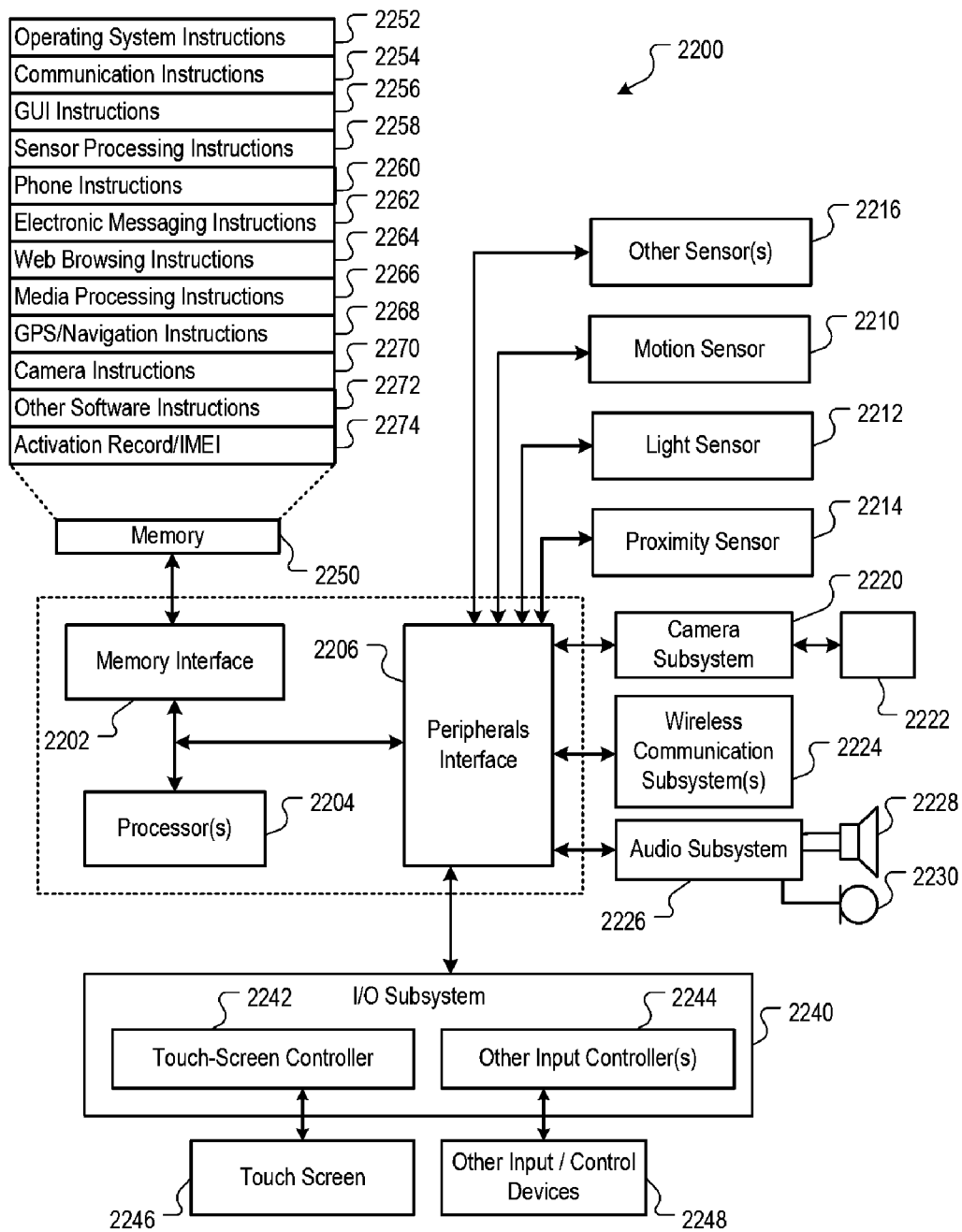
FIG. 22 is a block diagram of an example implementation of the mobile device of FIG. 1.

FIG. 22 is a block diagram 2200 of an example implementation of the mobile device 100 of FIG. 1. The mobile device 100 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 100 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described with respect to FIG. 1. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 100 is intended to operate. For example, a mobile device 100 may include communication subsystems 2224 designed to operate over a GSM network, a GPRS network, an EDGE network, a Wi-Fi or WiMax network, and a Bluetooth™ network. In particular, the wireless communication subsystems 2224 may include hosting protocols such that the device 100 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 100 on or off. The user may be able to customize a functionality of one or more of the buttons. The touch screen 2246 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 32-pin connector that is compatible with the iPod™. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store as shown in FIGS. 2-16; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 100 may be implemented in hardware and/or in software, including in one or more signal processing and/or application specific integrated circuits.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   receiving a touch input to a first display object in a graphical user interface, the first display object being associated with an application management interface on a mobile device;
   presenting the application management interface in response to the received touch input, the application management interface including a plurality of menu items wherein each menu item is associated with different criteria for presenting application objects corresponding to respective applications available for installation;
   presenting one or more application objects within the application management interface according to the criteria for a particular menu item, the one or more application objects corresponding to respective applications available for installation on the mobile device;
   receiving one or more inputs within the application management interface including an input to install a particular selected application;
   installing the selected application on the mobile device; and
   presenting a second display object associated with the installed application.

2. The method of claim 1, where presenting the application management interface further includes presenting a menu portion and a display portion.

3. The method of claim 2, where the display portion includes one or more application objects corresponding to respective applications, each application object presenting information about the respective application.

4. The method of claim 2, where the menu portion includes a plurality of tabs, each tab providing access to particular features of the application management interface.

5. The method of claim 1, where receiving one or more user inputs includes receiving a selection of a particular application object.

6. The method of claim 5, further comprising:
   in response to the selection, transitioning the display portion to present additional information about the selected application.

7. The method of claim 6, where presenting additional information includes presenting one or more reviews of the selected application.

8. The method of claim 5, where the selected application object is an application update object associated with an update to an application previously installed on the mobile device.

9. The method of claim 1, where installing the selected application includes presenting a placeholder object on a display of the mobile device, the placeholder object including an indicator of installation progress.

10. The method of claim 1, further comprising:
    receiving payment information from a user to purchase the particular application.

11. The method of claim 1, where the mobile device includes a multi-touch-sensitive display.

12. A system comprising:
    a processor; and
    a user interface for providing interaction with a user, the user interface including:
      a menu portion including a plurality of tabs, each tab providing access to particular features of the application management interface, wherein a selection of a particular tab modifies a display portion according to particular display criteria wherein the particular display criteria includes different criteria for presenting application objects corresponding to respective applications available for installation; and
      the display portion configured to display one or more application objects corresponding to respective applications according to the selected tab, each application object presenting information about the respective application, where each presented application is selectable for installation.

13. A system comprising:
a mobile device including a processor and operable to perform operations including:
receiving a touch input to a first display object in a graphical user interface, the first display object being associated with an application management interface on a mobile device;
presenting the application management interface in response to the received touch input, the application management interface including a plurality of menu items wherein each menu item is associated with different criteria for presenting application objects corresponding to respective applications available for installation;
presenting one or more application objects within the application management interface according to the criteria for a particular menu item, the one or more application objects corresponding to respective applications available for installation on the mobile device;
receiving one or more inputs within the application management interface including an input to install a particular selected application;
installing the selected application; and
presenting a second display object associated with the installed application.

14. The system of claim 13, where presenting the application management interface further includes presenting a menu portion and a display portion.

15. The system of claim 14, where the display portion includes one or more application objects corresponding to respective applications, each application object presenting information about the respective application.

16. The system of claim 14, where the menu portion includes a plurality of tabs, each tab providing access to particular features of the application management interface.

17. The system of claim 13, where receiving one or more user inputs includes receiving a selection of a particular application object.

18. The system of claim 17, further operable to perform operations comprising:
in response to the selection, transitioning the display portion to present additional information about the selected application.

19. The system of claim 18, where presenting additional information includes presenting one or more reviews of the selected application.

20. The system of claim 17, where the selected application object is an application update object associated with an update to an application previously installed on the mobile device.

21. The system of claim 13, where installing the selected application includes presenting a placeholder object on a display of the mobile device, the placeholder object including an indicator of installation progress.

22. The system of claim 13, further operable to perform operations comprising:
receiving payment information from a user to purchase the particular application.

23. The system of claim 13, where the mobile device includes a multi-touch-sensitive display.

24. A computer program product, stored on a computer readable medium, comprising instructions that when executed on a server cause the server to perform operations comprising:
receiving a touch input to a first display object in a graphical user interface, the first display object being associated with an application management interface on a mobile device;
presenting the application management interface in response to the received touch input, the application management interface including a plurality of menu items wherein each menu item is associated with different criteria for presenting application objects corresponding to respective applications available for installation;
presenting one or more application objects within the application management interface according to the criteria for a particular menu item, the one or more application objects corresponding to respective applications available for installation on the mobile device;
receiving one or more inputs within the application management interface including an input to install a particular selected application;
installing the selected application on the mobile device; and
presenting a second display object associated with the installed application.

25. A method comprising:
receiving a touch input to access an application management interface on a mobile device;
presenting the application management interface in response to the received touch input, the application management interface including a plurality of menu items to access different features of the application management interface and wherein the plurality of menu items includes a search menu item;
presenting a search field within the application management interface in response to a selection of the search menu item;
receiving a search input to the search field;
presenting one or more application objects in response to the search input, wherein the one or more application objects correspond to respective applications available for installation;
receiving one or more inputs within the application management interface including an input to install a particular selected application; and
installing the selected application on the mobile device.

* * * * *